(12) United States Patent
Takezawa

(10) Patent No.: US 8,317,339 B2
(45) Date of Patent: Nov. 27, 2012

(54) DISCHARGE LAMP LIGHTING DEVICE, PROJECTOR, AND CONTROL METHOD OF DISCHARGE LAMP LIGHTING DEVICE

(75) Inventor: Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 468 days.

(21) Appl. No.: 12/646,997

(22) Filed: Dec. 24, 2009

(65) Prior Publication Data

US 2010/0165305 A1 Jul. 1, 2010

(30) Foreign Application Priority Data

Dec. 26, 2008 (JP) ................................. 2008-332968

(51) Int. Cl.
*G03B 21/20* (2006.01)
*H01J 29/46* (2006.01)
*G01J 1/32* (2006.01)
(52) U.S. Cl. .......... 353/85; 353/121; 313/409; 313/441; 250/205
(58) Field of Classification Search ................ 353/85, 353/121; 313/308, 5, 409, 441, 246, 287; 250/205
See application file for complete search history.

(56) References Cited

U.S. PATENT DOCUMENTS

| 5,463,287 | A | 10/1995 | Kurihara et al. |
| 2008/0297739 | A1* | 12/2008 | Yamauchi et al. ............... 353/85 |
| 2009/0323033 | A1* | 12/2009 | Konishi et al. .................. 353/85 |

FOREIGN PATENT DOCUMENTS

| JP | 07-106072 | 4/1995 |
| JP | 2002-532866 | 10/2002 |
| WO | WO-00-36882 | 6/2000 |

* cited by examiner

*Primary Examiner* — Georgia Y Epps
*Assistant Examiner* — Magda Cruz
(74) *Attorney, Agent, or Firm* — AdvantEdge Law Group, LLC

(57) ABSTRACT

A discharge lamp lighting device includes: a discharge lamp driving unit that supplies an AC driving current to a discharge lamp to drive the discharge lamp; a current detecting unit that detects the AC driving current supplied to the discharge lamp; and a control unit that controls the discharge lamp driving unit, wherein the control unit controls the discharge lamp driving unit after a predetermined time from the start of lighting driving operation of the discharge lamp on the basis of the behavior of the AC driving current detected by the current detecting unit at the predetermined time from the start of lighting driving operation of the discharge lamp.

15 Claims, 13 Drawing Sheets

FIRST POLARITY STATE P1
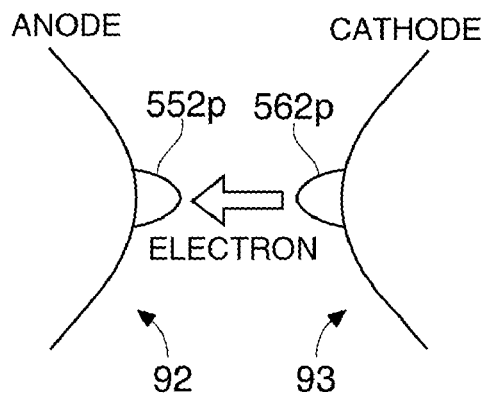
SECOND POLARITY STATE P2
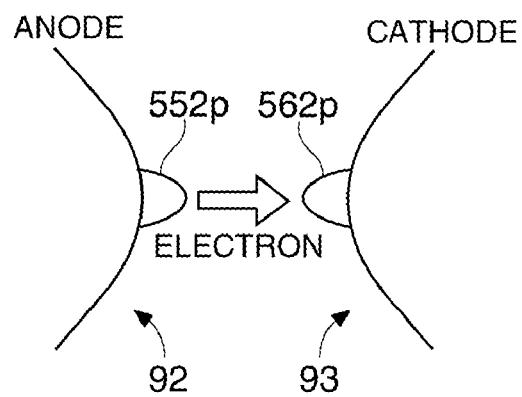
FIG. 5A
FIG. 5B
FIG. 5C
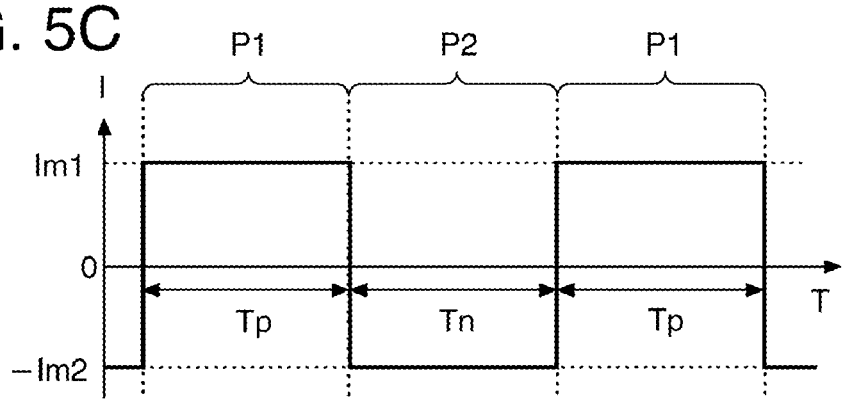
FIG. 5D
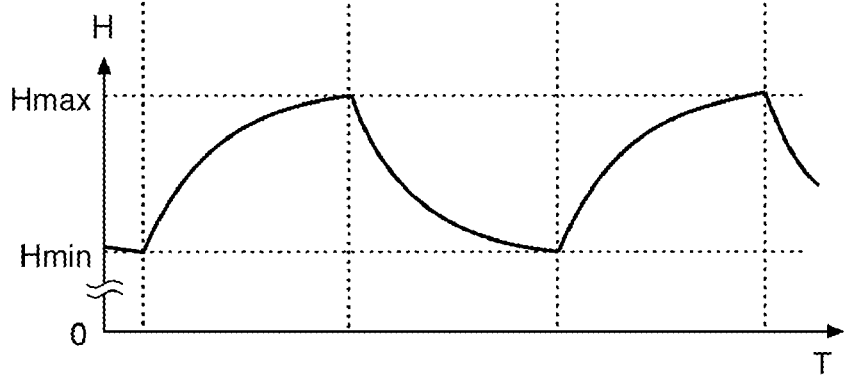

EXAMPLE OF WAVEFORM SUITABLE FOR DISCHARGE LAMP IN EARLY STAGE

EXAMPLE OF WAVEFORM SUITABLE FOR DISCHARGE LAMP AFTER USE FOR LONG PERIOD OF TIME

DISCHARGE LAMP LIGHTING DEVICE, PROJECTOR, AND CONTROL METHOD OF DISCHARGE LAMP LIGHTING DEVICE

BACKGROUND

1. Technical Field

The present invention relates to a discharge lamp lighting device, a projector, and a control method of a discharge lamp lighting device.

2. Related Art

Discharge lamps, such as high-pressure mercury lamps or metal halide lamps, have been used as light sources of a projector. In these discharge lamps, the shape of an electrode changes with consumption of the electrode by discharge. When a plurality of projections grows in an electrode tip portion or irregular consumption of the electrode body progresses, the arc point moves or and the arc length changes. Such phenomena are not desirable because they reduce the brightness of a discharge lamp so that the life of the discharge lamp is reduced.

The optimal driving condition (current value, frequency, duty ratio, and waveform of a driving current) of a discharge lamp changes with a state of the discharge lamp. For example, the optimal driving conditions are different immediately after the start of lighting and after a certain period of time has passed from lighting. Moreover, the optimal driving conditions are different between a discharge lamp which has been used for a short period of time and a discharge lamp which cannot be used much longer. In addition, the optimal driving condition also changes with the kind of a discharge lamp.

Using a discharge lamp under the driving condition which is not optimal is a cause of blackening or devitrification of a discharge tube. In addition, it also becomes a cause of flickering. For example, when a discharge lamp is used in a projector, the brightness of an image projected while the projector is being used changes.

For this reason, a discharge lamp lighting device was proposed in which a control circuit with a plurality of driving conditions set beforehand was provided in the discharge lamp lighting device and the driving condition could be selected appropriately according to the driving voltage (lamp voltage) at the time of normal lighting of a discharge lamp (see JP-T-2002-532866).

The driving voltage at the time of normal lighting of a discharge lamp is affected not only by deterioration or consumption of an electrode but also the internal volume in manufacturing an arc tube, a variation in the amount of mercury, or a temporal variation in the internal volume of the arc tube. Therefore, there is a limitation in checking the state of an electrode of a discharge lamp precisely on the basis of the driving voltage at the time of normal lighting of the discharge lamp.

SUMMARY

An advantage of some aspects of the invention is that it provides a discharge lamp lighting device capable of setting the driving condition of a discharge lamp more appropriately, a projector, and a control method of a discharge lamp lighting device.

According to an aspect of the invention, there is provided a discharge lamp lighting device including: a discharge lamp driving unit that supplies an AC driving current to a discharge lamp to drive the discharge lamp; a current detecting unit that detects the AC driving current supplied to the discharge lamp; and a control unit that controls the discharge lamp driving unit. The control unit controls the discharge lamp driving unit after a predetermined time from the start of lighting driving operation of the discharge lamp on the basis of the behavior of the AC driving current detected by the current detecting unit at the predetermined time from the start of lighting driving operation of the discharge lamp.

The predetermined time may be sufficient time for determining the behavior of the AC driving current, may be predetermined time set beforehand, or may be a variable time according to the behavior of the AC driving current.

According to the aspect of the invention, on the basis of the behavior of the AC driving current immediately after the start of lighting driving operation that further reflects the state of an electrode, the subsequent driving condition can be set. As a result, it is possible to realize the discharge lamp lighting device capable of setting the driving condition of the discharge lamp more appropriately.

In the discharge lamp lighting device according to the aspect of the invention, the control unit may perform first determination processing for determining whether or not a first period, for which an absolute value of an average current value of the AC driving current at the time of first polarity is equal to or larger than a first threshold value and an absolute value of an average current value of the AC driving current at the time of second polarity is equal to or larger than a second threshold value, continues for first reference time or more and may control the discharge lamp driving unit after the predetermined time from the start of lighting driving operation of the discharge lamp on the basis of the length of first time from the start of lighting driving operation of the discharge lamp to the start of the first period when it is determined that the first period continues for the first reference time or more in the first determination processing.

In the discharge lamp lighting device according to the aspect of the invention, the control unit may perform second determination processing for determining whether or not a second period, for which either an absolute value of an average current value of the AC driving current at the time of first polarity or an absolute value of an average current value of the AC driving current at the time of second polarity is equal to or larger than a third threshold value, continues for second reference time or more and may control the discharge lamp driving unit after the predetermined time from the start of lighting driving operation of the discharge lamp on the basis of the length of second time from the start of lighting driving operation of the discharge lamp to the start of the second period when it is determined that the second period continues for the second reference time or more in the second determination processing.

In the discharge lamp lighting device according to the aspect of the invention, the control unit may perform first determination processing for determining whether or not a first period, for which an absolute value of an average current value of the AC driving current at the time of first polarity is equal to or larger than a first threshold value and an absolute value of an average current value of the AC driving current at the time of second polarity is equal to or larger than a second threshold value, continues for first reference time or more and second determination processing for determining whether or not a second period, for which either the absolute value of the average current value of the AC driving current at the time of the first polarity or the absolute value of the average current value of the AC driving current at the time of the second polarity is equal to or larger than a third threshold value, continues for second reference time or more and may control the discharge lamp driving unit after the predetermined time from the start of lighting driving operation of the discharge lamp on the basis of the length of third time from the start of the second period to the start of the first period when it is determined that the first period continues for the first reference time or more in the first determination processing and the second period continues for the second reference time or more in the second determination processing.

In the discharge lamp lighting device according to the aspect of the invention, the control unit may perform specification determination processing for determining the specification of the discharge lamp on the basis of the length of one of the first to third times and control the discharge lamp driving unit after the predetermined time from the start of a lighting driving operation of the discharge lamp on the basis of a result of the specification determination processing.

In the discharge lamp lighting device according to the aspect of the invention, the control unit may perform the specification determination processing at the time of first lighting after connection between the discharge lamp lighting device and the discharge lamp or after resetting of the discharge lamp lighting device.

In the discharge lamp lighting device according to the aspect of the invention, the discharge lamp driving unit may include: a power control circuit that generates power for driving a discharge lamp; and an AC conversion circuit that generates and outputs the AC driving current, which is supplied to the discharge lamp, by inverting the polarity of a direct current output from the power control circuit at predetermined timing. The control unit may control the discharge lamp driving unit after the predetermined time from the start of lighting driving operation of the discharge lamp by performing at least one of AC conversion control for controlling polarity inversion timing of the AC driving current with respect to the AC conversion circuit and current control for controlling a current value of a direct current, which is output from the power control circuit, with respect to the power control circuit.

In the discharge lamp lighting device according to the aspect of the invention, the control unit may control at least one of a current value, frequency, duty ratio, and waveform of the AC driving current by controlling the discharge lamp driving unit.

The duty ratio is a ratio of the first polarity time in one period of the AC driving current whose polarity is inverted between the first and second polarities.

For example, as the first time, the second time, or the third time becomes long, the current value may be controlled to become large, the frequency may be controlled to become small, or the deviation (difference from 50%) of duty ratio may be controlled to become large. In addition, when control is performed such that a waveform is generated in which the accumulated energy given to an electrode in the second half of the half period of the AC driving current is larger than the accumulated energy given to the electrode in the first half, the difference between the accumulated energy given to the electrode in the second half and the accumulated energy given to the electrode in the first half may be controlled to become large as the first time, the second time, or the third time becomes long.

According to another aspect of the invention, there is provided a projector including a discharge lamp lighting device as described above.

According to still another aspect of the invention, there is provided a control method of a discharge lamp lighting device including a discharge lamp driving unit that supplies an AC driving current to a discharge lamp to drive the discharge lamp, a current detecting unit that detects the AC driving current supplied to the discharge lamp, and a control unit that controls the discharge lamp driving unit including: controlling the discharge lamp driving unit after a predetermined time from the start of a lighting driving operation of the discharge lamp on the basis of the behavior of the AC driving current, which is detected by the current detecting unit at the predetermined time from the start of lighting driving operation of the discharge lamp, by means of the control unit.

BRIEF DESCRIPTION OF THE DRAWINGS

The invention will be described with reference to the accompanying drawings, wherein like numbers reference like elements.

FIGS. 5A to 5D are explanatory views showing the relationship between the polarity of driving electric power supplied to a discharge lamp and the temperature of an electrode.

DESCRIPTION OF EXEMPLARY EMBODIMENTS

Hereinafter, preferred embodiments of the invention will be described in detail with reference to the accompanying drawings. In addition, the embodiments described below are not intended to limit the contents of the invention defined by the appended claims. In addition, all of the configurations described below are not necessarily essential components of the invention.

1. Optical System of a Projector

Figure 1:
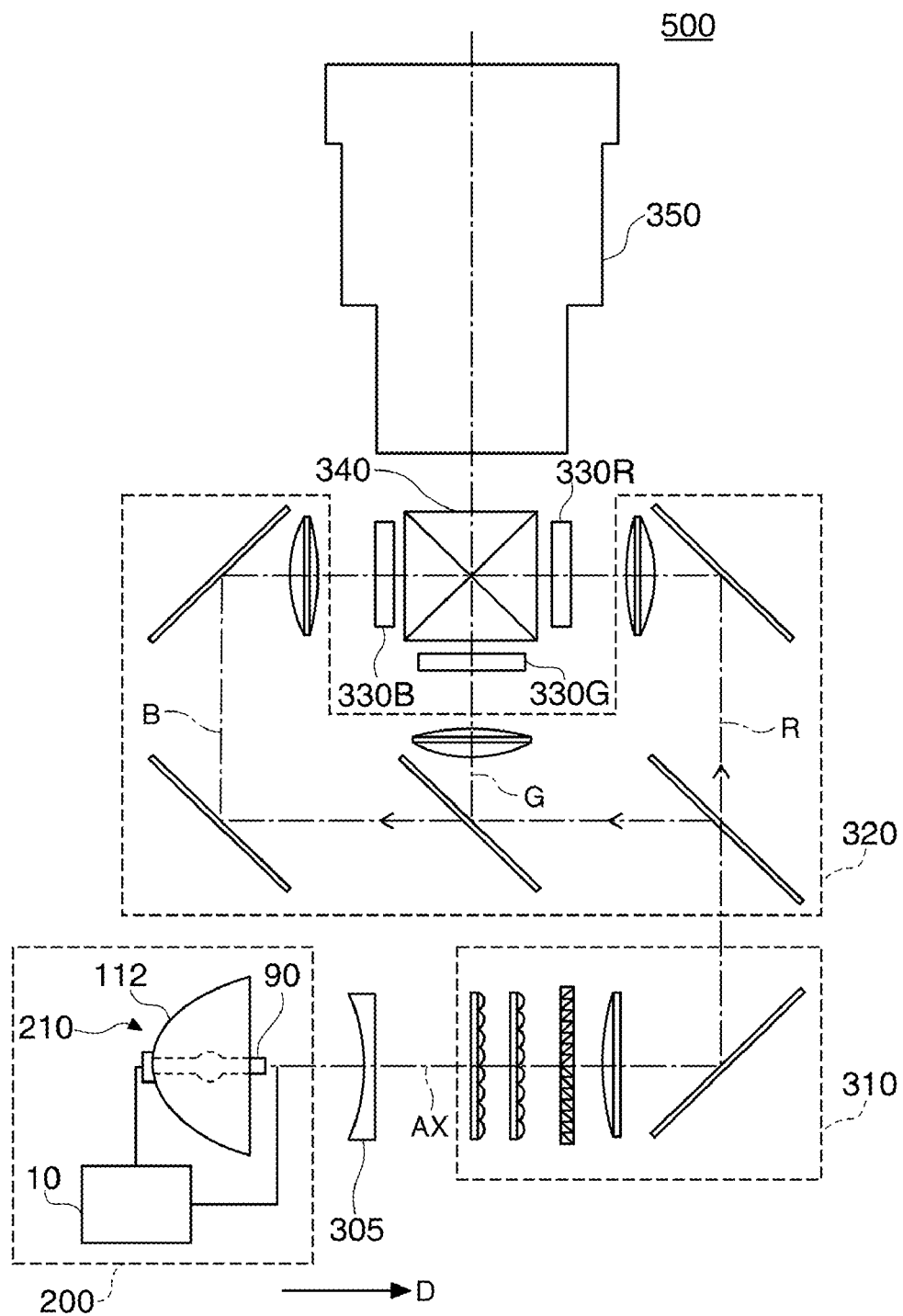
FIG. 1 is an explanatory view showing the configuration of a projector as an embodiment of the invention.

FIG. 1 is an explanatory view showing the configuration of a projector 500 as an embodiment of the invention. The projector 500 includes a light source device 200, a collimating lens 305, an illumination optical system 310, a color separation optical system 320, three liquid crystal light valves 330R, 330G, and 330B, a cross dichroic prism 340, and a projection optical system 350.

The light source device 200 has a light source unit 210 and a discharge lamp lighting device 10. The light source unit 210 has a main reflecting mirror 112, an auxiliary reflecting mirror 50, and a discharge lamp 90. The discharge lamp lighting device 10 supplies electric power to the discharge lamp 90 so that the discharge lamp 90 lights. The main reflecting mirror 112 reflects the light emitted from the discharge lamp 90 toward the irradiation direction D. The irradiation direction D is parallel to the optical axis AX. The light from the light source unit 210 passes through the collimating lens 305 and is then incident on the illumination optical system 310. The collimating lens 305 collimates the light from the light source unit 210.

The illumination optical system 310 equalizes the illuminance of the light from the light source device 200 in the liquid crystal light valves 330R, 330G, and 330B. In addition, the illumination optical system 310 aligns the polarization direction of the light from the light source device 200 in one direction. The reason is in order to use the light from the light source device 200 effectively in the liquid crystal light valves 330R, 330G, and 330B. The light whose illuminance distribution and polarization direction have been adjusted is incident on the color separation optical system 320. The color separation optical system 320 separates the incident light into three color light components of red (R), green (G), and blue (B). The three color light components are modulated by the liquid crystal light valves 330R, 330G, and 330B corresponding to the colors, respectively. The liquid crystal light valves 330R, 330G, and 330B include liquid crystal panels 560R, 560G, and 560B and polarizers disposed at the light incidence and emission sides of the liquid crystal panels 560R, 560G, and 560B, respectively. The three modulated color light components are mixed by the cross dichroic prism 340. The mixed light is incident on the projection optical system 350. The projection optical system 350 projects the incident light onto a screen (not shown). As a result, an image is displayed on the screen.

Moreover, various known configurations may be adopted as the configurations of the collimating lens 305, illumination optical system 310, color separation optical system 320, cross dichroic prism 340, and projection optical system 350.

Figure 2:
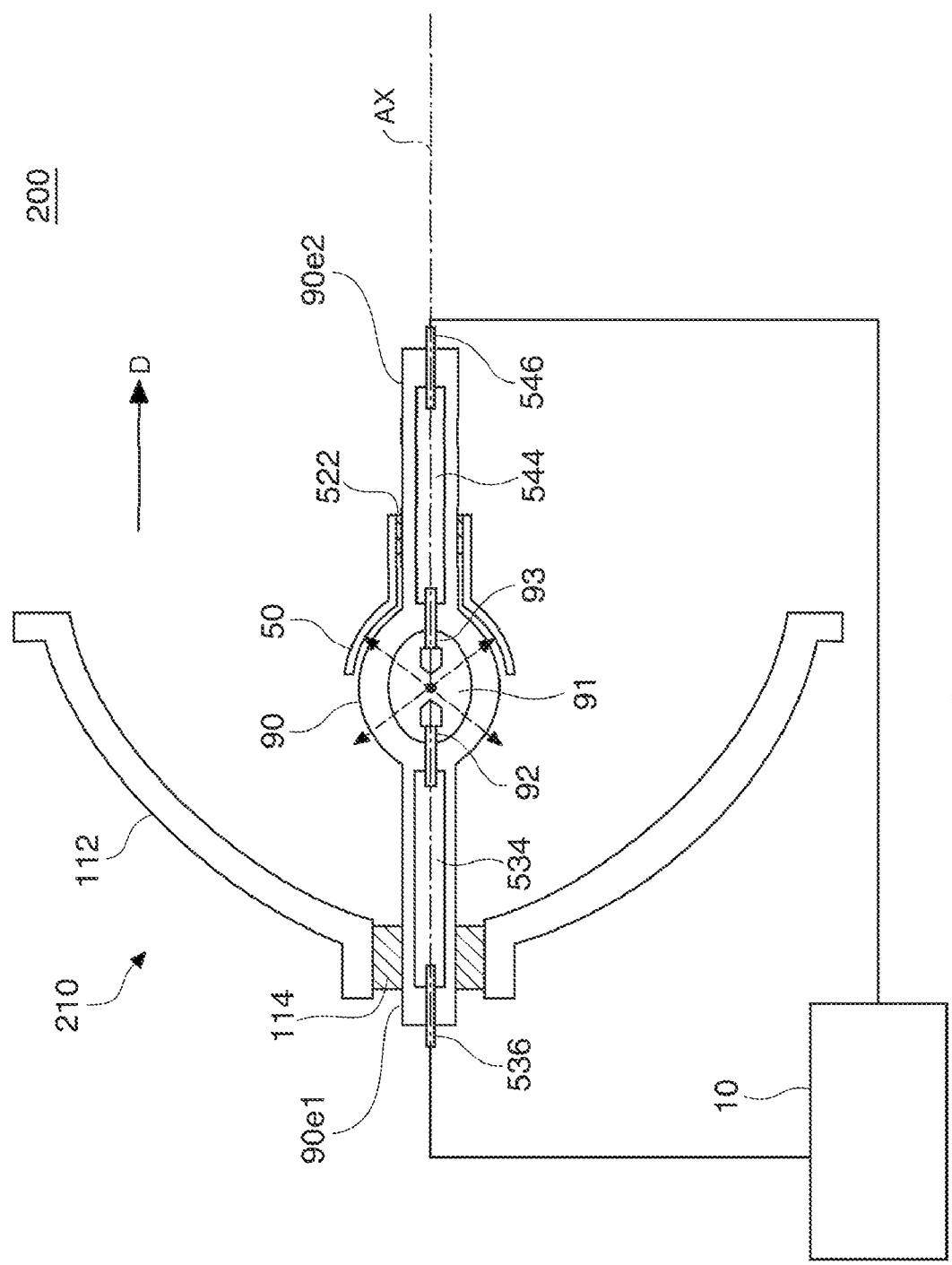
FIG. 2 is an explanatory view showing the configuration of a light source device.

FIG. 2 is an explanatory view showing the configuration of the light source device 200. The light source device 200 has the light source unit 210 and the discharge lamp lighting device 10. In FIG. 2, the sectional view of the light source unit 210 is shown. The light source unit 210 has the main reflecting mirror 112, the discharge lamp 90, and the auxiliary reflecting mirror 50.

The discharge lamp 90 has a rod shape which extends from a first end 90e1 to a second end 90e2 along the irradiation direction D. A material of the discharge lamp 90 is a translucent material, such as quartz glass. The middle portion of the discharge lamp 90 expands in the spherical shape, and a discharge space 91 is formed therein. Rare gas and gas, which is a discharge medium containing a metal halogen compound and the like, are injected into the discharge space 91.

Moreover, in the discharge space 91, two electrodes 92 and 93 protrude from the discharge lamp 90. The first electrode 92 is disposed at the first end 90e1 side of the discharge space 91, and the second electrode 93 is disposed at the second end 90e2 side of the discharge space 91. Each of the electrodes 92 and 93 has a rod shape extending along at the optical axis AX. In the discharge space 91, tip portions (also called "discharge ends") of the electrodes 92 and 93 face each other with a predetermined distance therebetween. In addition, the material of each of the electrodes 92 and 93 is metal, such as tungsten.

A first terminal 536 is provided at the first end 90e1 of the discharge lamp 90. The first terminal 536 and the first electrode 92 are electrically connected to each other by a conductive member 534 passing through the inside of the discharge lamp 90. Similarly, the second terminal 546 is provided at the second end 90e2 of the discharge lamp 90. The second terminal 546 and the second electrode 93 are electrically connected to each other by a conductive member 544 passing through the inside of the discharge lamp 90. The material of each of the terminals 536 and 546 is metal, such as tungsten. Moreover, for example, a molybdenum foil is used for the conductive members 534 and 544.

The terminals 536 and 546 are connected to the discharge lamp lighting device 10. The discharge lamp lighting device 10 supplies an alternate current to the terminals 536 and 546. As a result, arc discharge occurs between the two electrodes 92 and 93. The light (discharge light) generated by the arc discharge is emitted in all directions from the discharge position, as indicated by dotted arrows.

The main reflecting mirror 112 is fixed to the first end 90e1 of the discharge lamp 90 by a fixing member 114. The reflecting surface (surface facing the discharge lamp 90) of the main reflecting mirror 112 has a spheroidal shape. The main reflecting mirror 112 reflects the discharge light toward the irradiation direction D. In addition, the shape of the reflecting surface of the main reflecting mirror 112 is not limited to the spheroidal shape, and various shapes allowing the discharge light to be reflected toward the irradiation direction D may be adopted. For example, the shape of paraboloid of revolution may be adopted. In this case, the main reflecting mirror 112 can convert the discharge light into light which is almost parallel to the optical axis AX. Accordingly, the collimating lens 305 may not be provided.

The auxiliary reflecting mirror 50 is fixed to the second end 90e2 side of the discharge lamp 90 by a fixing member 522. The reflecting surface (surface facing the discharge lamp 90) of the auxiliary reflecting mirror 50 has a spherical shape surrounding the second end 90e2 side of the discharge space 91. The auxiliary reflecting mirror 50 reflects the discharge light toward the main reflecting mirror 112. Thus, the use efficiency of the light emitted from the discharge space 91 can be improved.

In addition, as the material of the fixing members 114 and 522, an arbitrary heat-resistant material (for example, an inorganic adhesive) which can stand the heat generation of the discharge lamp 90 may be adopted. In addition, the method of fixing the arrangement of the main reflecting mirror 112 and the auxiliary reflecting mirror 50 and the discharge lamp 90 is not limited to the method of fixing the main reflecting mirror 112 and the auxiliary reflecting mirror 50 to the discharge lamp 90 and an arbitrary method may be adopted. For example, the discharge lamp 90 and the main reflecting mirror 112 may be fixed independently in a housing (not shown) of a projector. The same is true for the auxiliary reflecting mirror 50.

Figure 3:
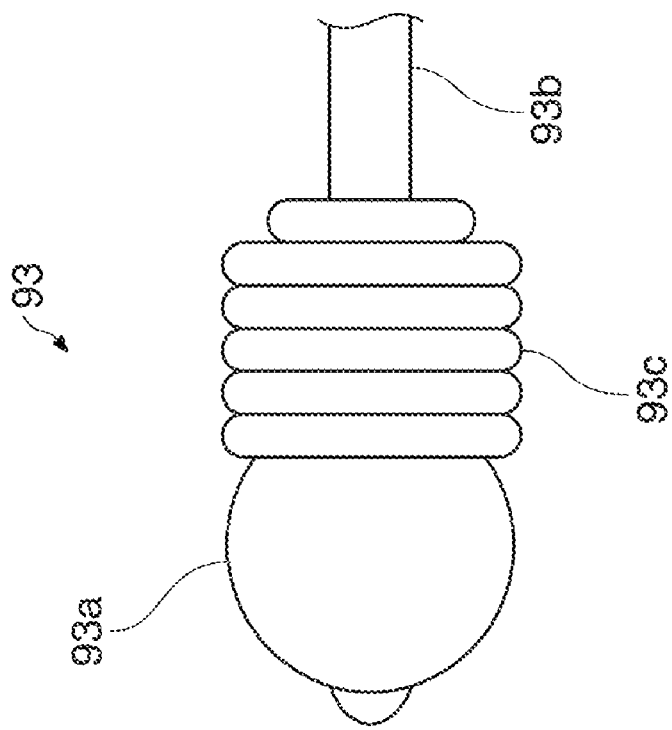
FIG. 3 is an explanatory view showing an example of the configuration of an electrode.
Figure 3:
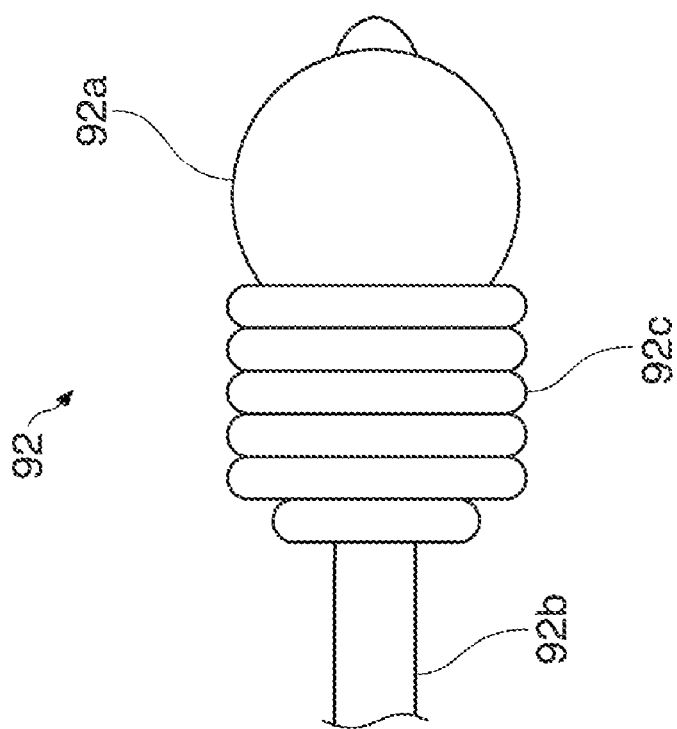

FIG. 3 is an explanatory view showing an example of the configuration of an electrode. The electrode 92 includes an electrode tip portion 92a, a shaft portion 92b, and a coil portion 92c. Similarly, the electrode 93 includes an electrode tip portion 93a, a shaft portion 93b, and a coil portion 93c.

The electrode tip portion 92a and the shaft portion 92b are integrally formed, and the shaft portion 92b is connected to the conductive member 534. The coil portion 92c is formed so as to be separated from the electrode tip portion 92a and the shaft portion 92*b*, and a part of the coil portion 92*c* is in contact with the electrode tip portion 92*a* or the shaft portion 92*b* so that the coil portion 92*c* is electrically connected thereto. Accordingly, between the electrode tip portion 92*a* and the coil portion 92*c* and between the shaft portion 92*b* and the coil portion 92*c*, a configuration (configuration in which the electrode tip portion 92*a* and the shaft portion 92*b* are almost separated thermally from the coil portion 92*c*) in which the amount of movement of heat is small is realized.

Similarly, the electrode tip portion 93*a* and the shaft portion 93*b* are integrally formed, and the shaft portion 93*b* is connected to the conductive member 544. The coil portion 93*c* is formed so as to be separated from the electrode tip portion 93*a* and the shaft portion 93*b*, and a part of the coil portion 93*c* is in contact with the electrode tip portion 93*a* or the shaft portion 93*b* so that the coil portion 93*c* is electrically connected thereto. In addition, the contact area between the electrode tip portion 93*a* or the shaft portion 93*b* and the coil portion 93*c* is set to be small so that a configuration (configuration in which the electrode tip portion 93*a* and the shaft portion 93*b* are almost separated thermally from the coil portion 93*c*) with a small amount of heat movement is realized.

When dielectric breakdown occurs due to a high voltage applied between the electrodes 92 and 93, gas used as a discharge medium is ionized and accordingly, glow discharge occurs. During the glow discharge, ionized positive ions collide with, in particular, a place (for example, protruding parts of the electrode tip portions 92*a* and 93*a* or coil portions 92*c* and 93*c*) of the electrode where the electric field concentrates such that energy is supplied to the electrode. This increases the electrode temperature, and arc discharge starts from the place which has reached the temperature of thermionic emission first.

Since the electrode tip portions 92*a* and 93*a* are formed integrally with the shaft portions 92*b* and 93*b*, respectively, the heat capacity is large. Accordingly, the temperature is difficult to rise. On the other hand, the coil portions 92*c* and 93*c* are small in volume. Accordingly, since the heat capacity is small, the temperature rises easily. For this reason, the arc discharge usually starts from the coil portions 92*c* and 93*c*.

However, if the discharge lamp 90 is used for a long period of time, an electrode material is accumulated at the gap between the shaft portion and the coil portion of the electrode. As a result, the physical contact area between the shaft portion and the coil portion becomes large. This increases the amount of heat movement between the shaft portion and the coil portion.

Accordingly, if the discharge lamp 90 is used for a long period of time, the temperatures of the coil portions 92*c* and 93*c* are difficult to rise. As a result, the time until the arc discharge starts becomes long.

Similarly, in the case of a discharge lamp which has an electrode with the large heat capacity, the temperature of the electrode is difficult to rise compared with a discharge lamp which has an electrode with the small heat capacity. Accordingly, the time until the arc discharge starts also becomes long.

In addition, when the temperature of one electrode reaches the temperature of thermionic emission but the temperature of the other electrode does not reach the temperature of thermionic emission, the arc discharge occurs only from the one electrode. Hereinafter, such a period is called a half-wave period.

The more difficult the temperature of the electrode is to rise, the longer the half-wave period is. Accordingly, the longer the discharge lamp 90 is used, the longer the half-wave period is. Similarly, in the case of the discharge lamp which has an electrode with the large heat capacity, the half wave period becomes long.

Figure 4:
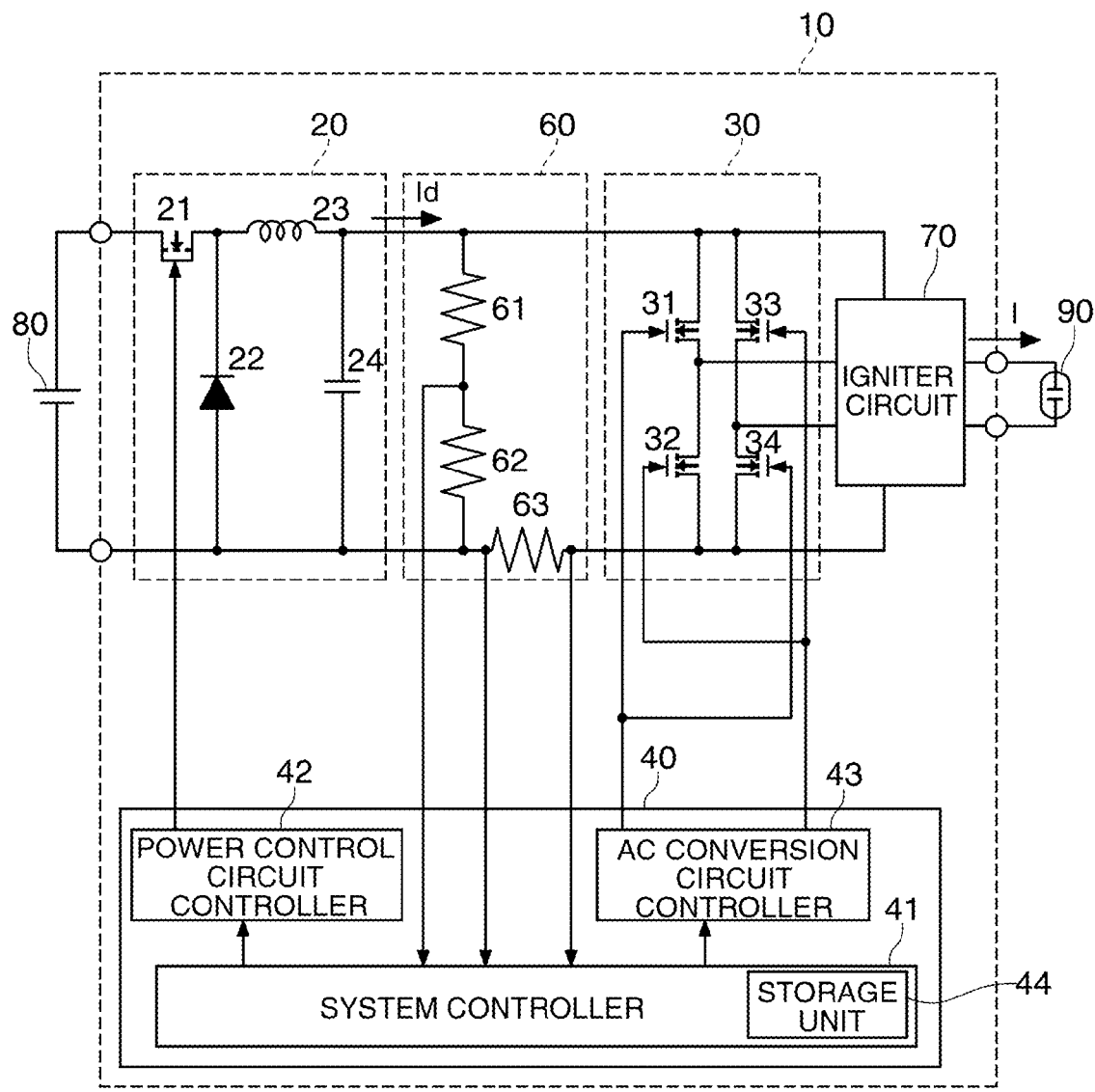
FIG. 4 is a circuit diagram showing a discharge lamp lighting device according to the present embodiment.
Figure 6A:
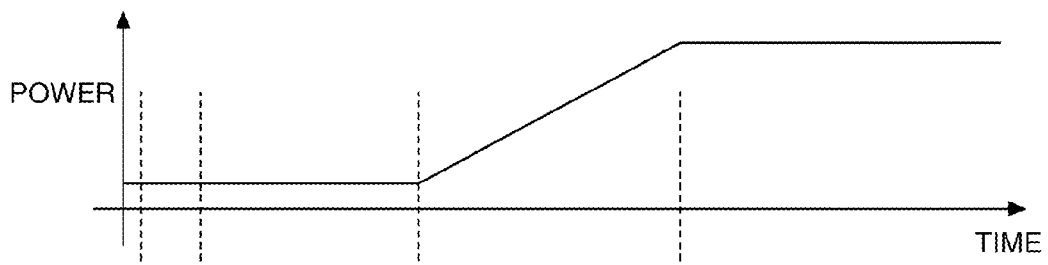
FIGS. 6A to 6D are graphs schematically showing the driving electric power, the effective value of a driving voltage, the effective value of an AC driving current, and the waveform of the AC driving current from the start of lighting driving operation of a discharge lamp to a normal operation.
Figure 6B:
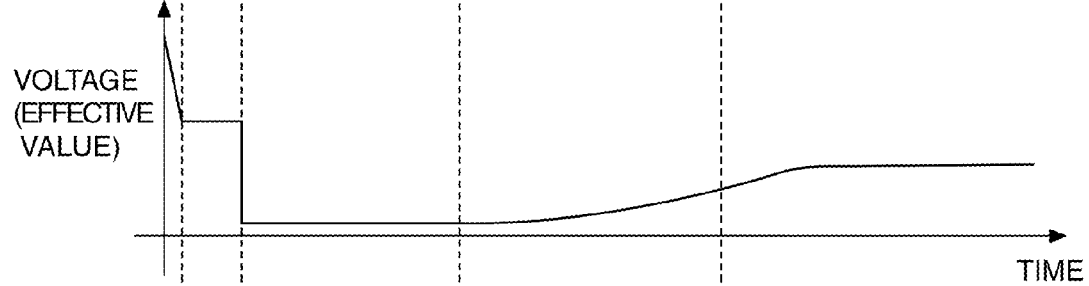
Figure 6C:
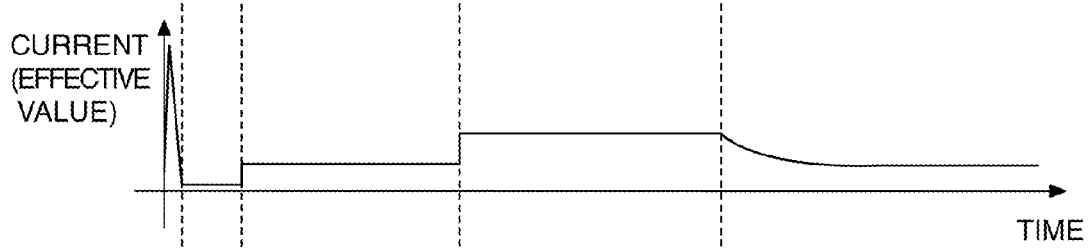
Figure 6D:
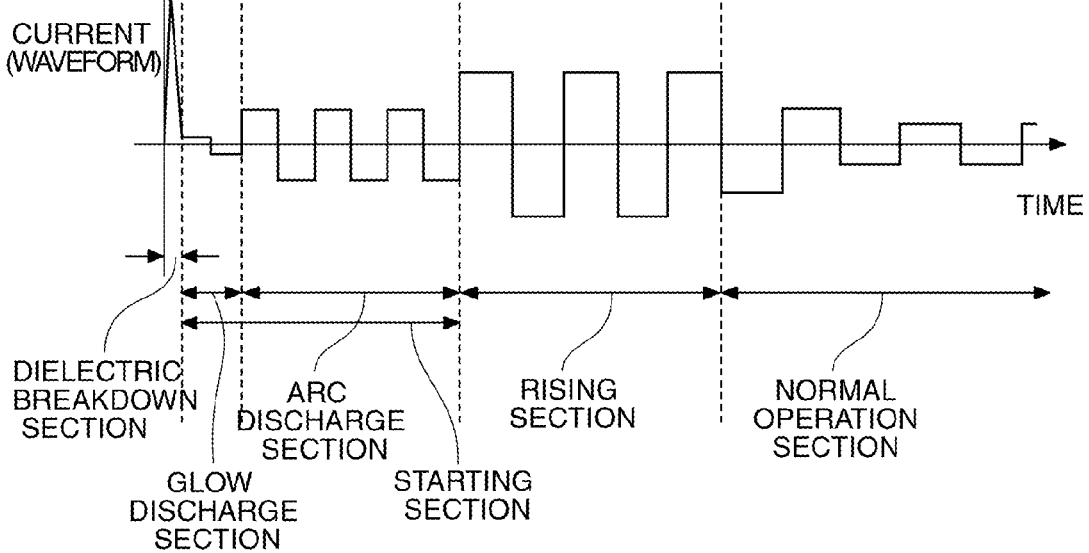

2. Discharge Lamp Lighting Device
(1) Configuration of a Discharge Lamp Lighting Device FIG. 4 shows an example of the circuit diagram of the discharge lamp lighting device according to the present embodiment.

The discharge lamp lighting device 10 includes a power control circuit 20. The power control circuit 20 generates driving electric power supplied to the discharge lamp 90. In the present embodiment, the power control circuit 20 is formed by a down chopper circuit to which power from a DC power supply 80 is input and from which a direct current Id is output after dropping the input voltage.

The power control circuit 20 may be configured to include a switching element 21, a diode 22, a coil 23, and a condenser 24. The switching element 21 may be formed by a transistor, for example. In the present embodiment, one end of the switching element 21 is connected to a positive voltage side of the DC power supply 80, and the other end is connected to a cathode terminal of the diode 22 and one end of the coil 23. In addition, one end of the condenser 24 is connected to the other end of the coil 23, and the other end of the condenser 24 is connected to an anode terminal of the diode 22 and a negative voltage side of the DC power supply 80. A current control signal from a control unit 40 is input to a control terminal of the switching element 21 so that ON/OFF of the switching element 21 is controlled. For example, a PWM (Pulse Width Modulation) control signal may be used as the current control signal.

Here, when the switching element 21 is turned ON, a current flows through the coil 23 so that the energy is stored in the coil 23. Then, when the switching element 21 is turned OFF, the energy stored in the coil 23 is discharged in a path passing through the condenser 24 and the diode 22. As a result, the direct current Id corresponding to the rate of time for which the switching element 21 is in the ON state is generated.

The discharge lamp lighting device 10 includes an AC conversion circuit 30. The direct current Id output from the power control circuit 20 is input to the AC conversion circuit 30. Then, the AC conversion circuit 30 inverts the polarity of the direct current Id at the predetermined timing to generate and output a driving current for discharge lamp driving which has an arbitrary frequency. In the present embodiment, the AC conversion circuit 30 is formed by an inverter bridge circuit (full bridge circuit).

For example, the AC conversion circuit 30 is configured to include first to fourth switching elements 31 to 34, such as transistors. That is, the AC conversion circuit 30 is formed by connecting the first and second switching elements 31 and 32, which are connected in series, in parallel to the third and fourth switching elements 33 and 34 connected in series. A frequency control signal from the control unit 40 is input to control terminals of the first to fourth switching elements 31 to 34 so that ON/OFF of the first to fourth switching elements 31 to 34 is controlled.

The AC conversion circuit 30 alternately inverts the polarity of the direct current Id output from the power control circuit 20 by alternately repeating ON/OFF of the first and fourth switching elements 31 and 34 and the second and third switching elements 32 and 33 and generates and outputs an AC driving current I, which has a controlled frequency, from a common connection point of the first and second switching elements 31 and 32 and a common connection point of the third and fourth switching elements 33 and 34.

That is, the AC conversion circuit 30 performs control such that the second and third switching elements 32 and 33 are turned OFF when the first and fourth switching elements 31 and 34 are turned ON and the second and third switching elements 32 and 33 are turned ON when the first and fourth switching elements 31 and 34 are turned OFF. Accordingly, when the first and fourth switching elements 31 and 34 are turned ON, the AC driving current I which flows from one end of the condenser 24 through the first switching element 31, the discharge lamp 90, and the fourth switching element 34 in this order is generated. In addition, when the second and third switching elements 32 and 33 are turned ON, the AC driving current I which flows from one end of the condenser 24 through the third switching element 33, the discharge lamp 90, and the second switching element 32 in this order is generated.

In the present embodiment, a combination of the power control circuit 20 and the AC conversion circuit 30 corresponds to a discharge lamp driving unit.

The discharge lamp lighting device 10 includes the control unit 40. The control unit 40 controls the current value and frequency of the AC driving current I by controlling the power control circuit 20 and the AC conversion circuit 30. The control unit 40 performs AC conversion control for controlling the frequency at the polarity inversion timing of the AC driving current I with respect to the AC conversion circuit 30. In addition, the control unit 40 performs current control for controlling the current value of the output direct current Id with respect to the power control circuit 20.

The configuration of the control unit 40 is not particularly limited. In the present embodiment, the control unit 40 is configured to include a system controller 41, a power control circuit controller 42, and an AC conversion circuit controller 43. In addition, a part or the entire control unit 40 may be formed by a semiconductor integrated circuit.

A system controller 41 controls the power control circuit 20 and the AC conversion circuit 30 by controlling the power control circuit controller 42 and the AC conversion circuit controller 43. The system controller 41 may control the power control circuit controller 42 and the AC conversion circuit controller 43 on the basis of the discharge lamp driving voltage and the AC driving current I detected by an operation detecting unit 60 provided in the discharge lamp lighting device 10, which will be described later.

In the present embodiment, the system controller 41 is configured to include a storage unit 44. In addition, the storage unit 44 may be provided separately from the system controller 41.

The system controller 41 may control the power control circuit 20 and the AC conversion circuit 30 on the basis of the information stored in the storage unit 44. For example, the information regarding at least one of current value, frequency, duty ratio and waveform of the AC driving current I and the information regarding the specification of the discharge lamp 90 may be stored in the storage unit 44.

The power control circuit controller 42 controls the power control circuit 20 by outputting a current control signal to the power control circuit 20 on the basis of the control signal from the system controller 41.

The AC conversion circuit controller 43 controls the AC conversion circuit 30 by outputting an AC conversion control signal to the AC conversion circuit 30 on the basis of the control signal from the system controller 41.

The discharge lamp lighting device 10 may also include the operation detecting unit 60. The operation detecting unit 60 may include a voltage detecting section, which detects a discharge lamp driving voltage Vd of the discharge lamp 90 and outputs the driving voltage information, or a current detecting section which detects the AC driving current I and outputs the driving current information, for example. In the present embodiment, the operation detecting unit 60 is configured to include first to third resistors 61 to 63.

In the present embodiment, the voltage detecting section detects the discharge lamp driving voltage using a voltage divided by the first and second resistors 61 and 62 which are connected in series and are connected in parallel to the discharge lamp 90. Moreover, in the present embodiment, the current detecting section detects the AC driving current I using a voltage generated in the third resistor 63 connected in series to the discharge lamp 90.

The discharge lamp lighting device 10 may also include an igniter circuit 70. The igniter circuit 70 operates only at the start of lighting of the discharge lamp 90 and applies a high voltage (voltage which is higher than the voltage at the time of normal control operation), which is required to form the discharge path by dielectric breakdown between the electrodes 92 and 93 of the discharge lamp 90 at the start of lighting of the discharge lamp 90, between the electrodes 92 and 93 of the discharge lamp 90. In the present embodiment, the igniter circuit 70 is connected in parallel to the discharge lamp 90.

FIGS. 5A to 5D are explanatory views showing the relationship between the polarity of driving electric power supplied to the discharge lamp 90 and the temperature of an electrode. FIGS. 5A and 5B show the operation state of the two electrodes 92 and 93. In FIGS. 5A and 5B, tip portions of the two electrodes 92 and 93 are shown. Projections 552p and 562p are provided on the tips of the electrodes 92 and 93, respectively. Discharge occurs between the projections 552p and 562p. In the present embodiment, the movement of the discharge position (arc position) in each of the electrodes 92 and 93 can be suppressed compared with the case where there is no projection. However, such projections may not be provided.

FIG. 5A shows a first polarity state P1 where the first electrode 92 operates as an anode and the second electrode 93 operates as a cathode. In the first polarity state P1, an electron moves from the second electrode 93 (cathode) to the first electrode 92 (anode) by discharge. An electron is emitted from the cathode (second electrode 93). The electron emitted from the cathode (second electrode 93) collides with the tip of the anode (first electrode 92). Heat is generated by the collision, and the temperature of the tip (projection 552p) of the anode (first electrode 92) rises.

FIG. 5B shows a second polarity state P2 where the first electrode 92 operates as a cathode and the second electrode 93 operates as an anode. In the second polarity state P2, an electron moves from the first electrode 92 to the second electrode 93 contrary to the first polarity state P1. As a result, the temperature of the tip (projection 562p) of the second electrode 93 rises.

Thus, the temperature of the anode is likely to rise compared with the cathode. Here, it may cause various troubles to keep the state where the temperature of one electrode is higher than that of the other electrode. For example, when the tip of a high-temperature electrode melts excessively, unintended electrode deformation may occur. As a result, the arc length may deviate from the appropriate value. In addition, when the tip of a low-temperature electrode melts insufficiently, fine uneven parts generated on the tip may remain without melting away. As a result, so-called arc jump may occur (arc position is not stabilized but moves).

As a technique of suppressing such a trouble, AC driving for changing the polarity of each electrode repeatedly may be used. FIG. 5C is a timing chart showing the AC driving current (driving signal) supplied to the discharge lamp 90 (FIG. 2). The horizontal axis indicates time T, and the vertical axis indicates the current value of the AC driving current I. The AC driving current I indicates a current flowing through the discharge lamp 90. The positive value indicates the first polarity state P1, and the negative value indicates the second polarity state P2. In the example of FIG. 5C, a rectangular wave alternating current is used. In addition, the first and second polarity states P1 and P2 are repeated alternately. Here, a first polarity section Tp indicates time for which the first polarity state P1 continues, and a second polarity section Tn indicates time for which the second polarity state P2 continues. In addition, the average current value of the first polarity section Tp is Im1, and the average current value of the second polarity section Tn is −Im2. In addition, the driving frequency may be experimentally determined according to the characteristic of the discharge lamp 90 (for example, the value in the range of 30 Hz to 1 kHz is adopted). Similarly, the other values Im1, −Im2, Tp, and Tn may also be experimentally determined.

FIG. 5D is a timing chart showing a change in the temperature of the first electrode 92. The horizontal axis indicates time T, and the vertical axis indicates temperature H. The temperature H of the first electrode 92 rises in the first polarity state P1 and drops in the second polarity state P2. In addition, since the first and second polarity states P1 and P2 are repeated, the temperature H changes periodically between the minimum value Hmin and the maximum value Hmax. In addition, although not shown, the temperature of the second electrode 93 changes in an opposite phase to the temperature H of the first electrode 92. That is, the temperature of the second electrode 93 drops in the first polarity state P1 and rises in the second polarity state P2.

Since the tip of the first electrode 92 (projection 552p) melts in the first polarity state P1, the tip of the first electrode 92 (projection 552p) becomes smooth. As a result, the movement of the discharge position in the first electrode 92 can be suppressed. In addition, since the temperature of the tip of the second electrode 93 (projection 562p) drops, the excessive melting of the second electrode 93 (projection 562p) is suppressed. As a result, electrode deformation which is not intended can be suppressed. In the second polarity state P2, the states of the first and second electrodes 92 and 93 are opposite. Thus, a trouble in each of the two electrodes 92 and 93 can be suppressed by repeating the two states P1 and P2.

(2) Example regarding the control of a discharge lamp lighting device

Next, a specific example regarding the control of the discharge lamp lighting device 10 according to the present embodiment will be described.

FIGS. 6A to 6D are graphs schematically showing the driving electric power, the effective value of the driving voltage, the effective value of the AC driving current I, and the waveform of the AC driving current I from the start of lighting driving operation of the discharge lamp 90 to a normal operation when the discharge lamp 90 is driven by the discharge lamp lighting device 10 according to the present embodiment. The horizontal axis indicates time. The actual AC driving current I has a frequency higher than the waveform shown in FIG. 6D.

In the dielectric breakdown section, a high voltage is applied between the electrodes 92 and 93 of the discharge lamp 90 by the igniter circuit 70, and a discharge path is formed by dielectric breakdown between the electrodes 92 and 93.

When the discharge path is formed, a glow discharge section in which glow discharge occurs between the electrodes 92 and 93 appears. When the electrodes 92 and 93 reach the temperature of thermionic emission by the glow discharge, an arc discharge section in which arc discharge occurs between the electrodes 92 and 93 appears. In the arc discharge section, the effective value of the driving voltage is small and the effective value of the AC driving current is large compared with those in the glow discharge section. In addition, the glow discharge section and the arc discharge section are hereinafter called a starting section.

Then, a rising section appears in which the supplied power increases up to predetermined driving electric power. After reaching the predetermined driving electric power, a normal operation section appears in which driving using constant electric power is performed.

The control unit 40 of the discharge lamp lighting device 10 according to the present embodiment controls the discharge lamp driving unit after a predetermined time from the start of lighting driving operation of the discharge lamp 90 on the basis of the behavior of the AC driving current I detected by a current detecting section 63 at a predetermined time from the start of lighting driving operation of the discharge lamp 90.

In a time zone which is short from the start of lighting driving operation of the discharge lamp 90, the internal temperature of the discharge lamp 90 is low compared with that at the time of normal driving operation. Accordingly, the behavior of the AC driving current I especially in the starting section is not easily affected by the internal volume in manufacturing the discharge lamp 90, a variation in the amount of mercury, or a temporal variation in the internal volume of the discharge lamp 90. For this reason, on the basis of the behavior of the AC driving current I immediately after the start of lighting driving operation that further reflects the states of the electrodes 92 and 93, the subsequent driving condition can be set. Thus, it is possible to realize the discharge lamp lighting device 10 capable of setting the driving condition of the discharge lamp 90 more appropriately.

Figure 7:
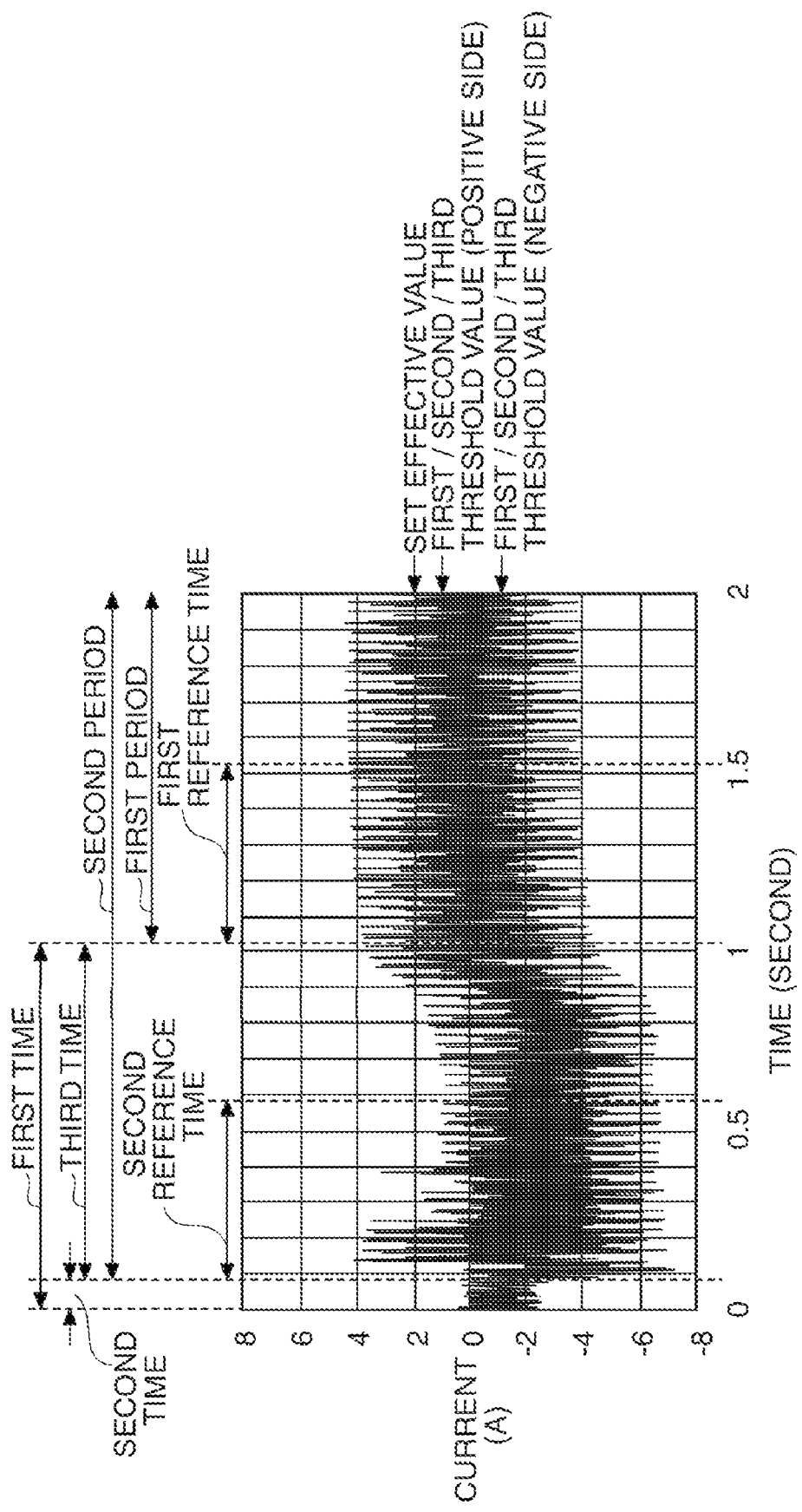
FIG. 7 is a graph showing an example of the behavior of an AC driving current in a starting section.

FIG. 7 is a graph showing an example of the behavior of the AC driving current I in the starting section. The horizontal axis indicates time, and the vertical axis indicates the current value of the AC driving current I.

The control unit 40 of the discharge lamp lighting device 10 according to the present embodiment performs first determination processing for determining whether or not a first period, for which the absolute value of the average current value of the AC driving current I at the time of the first polarity is equal to or larger than a first threshold value and the absolute value of the average current value of the AC driving current I at the time of the second polarity is equal to or larger than a second threshold value, continues for the first reference time or more. When it is determined that the first period continues for the first reference time or more in the first determination processing, the control unit 40 may control the discharge lamp driving unit after the predetermined time from the start of the lighting driving operation of the discharge lamp 90 on the basis of the length of first time from the start of lighting driving operation of the discharge lamp 90 to the start of the first period.

In the present embodiment, an example is described in which the fixed time of about 2 to 3 seconds from the start of lighting driving operation is set as the "predetermined time". However, the "predetermined time" is preferably the time which is sufficient for performing the first determination processing. For example, predetermined time (for example, about 1 second) after elapse of the first reference time may also be set as the "predetermined time".

In the present embodiment, the control unit 40 controls the discharge lamp driving unit after the predetermined time from the start of lighting driving operation of the discharge lamp 90 on the basis of the length of time (first time) until the arc discharge occurs stably from both of the electrodes 92 and 93 from the start of lighting driving operation of the discharge lamp 90. The longer the discharge lamp 90 is used, the more difficult the temperature of the electrode is to rise. Accordingly, in this case, the first time becomes long. Thus, the driving condition of the discharge lamp 90 can be set appropriately on the basis of the first time.

Figure 8:
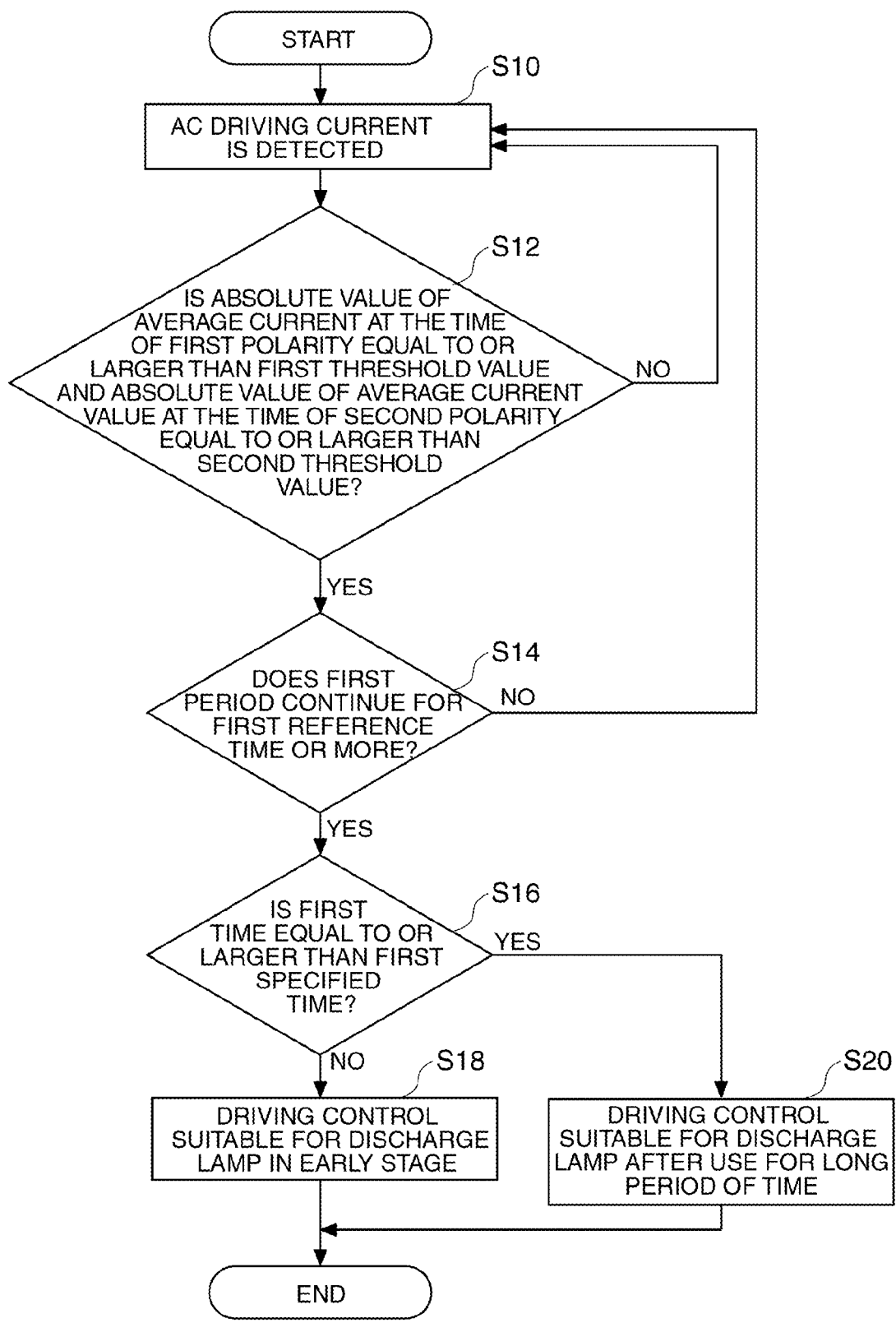
FIG. 8 is a flow chart showing an example regarding the control of the discharge lamp lighting device according to the present embodiment.

FIG. 8 is a flow chart showing an example regarding the control of the discharge lamp lighting device according to the present embodiment. In addition, processing including steps S12 and S14, which will be described later, corresponds to the first determination processing described above.

First, the current detecting section 63 detects the AC driving current I (step S10). Then, the control unit 40 determines whether or not the absolute value of the average current value of the AC driving current I at the time of the first polarity is equal to or larger than the first threshold value and the absolute value of the average current value of the AC driving current I at the time of the second polarity is equal to or larger than the second threshold value (step S12). When it is determined that the absolute value of the average current value of the AC driving current I at the time of the first polarity is not equal to or larger than the first threshold value and the absolute value of the average current value of the AC driving current I at the time of the second polarity is not equal to or larger than the second threshold value in step S12 (NO in step S12), steps S10 to S12 are repeated.

The first and second threshold values may be set to about ½ of the set effective current value of the AC driving current I in the arc discharge section, for example. In the example shown in FIG. 7, the set effective current value of the AC driving current I is set to 2 Ampere. In this case, the first and second threshold values may be set to 1 Ampere. In the present embodiment, the first and second threshold values are the same values. However, the first and second threshold values may be different values.

When it is determined that the absolute value of the average current value of the AC driving current I at the time of the first polarity is equal to or larger than the first threshold value and the absolute value of the average current value of the AC driving current I at the time of the second polarity is equal to or larger than the second threshold value in step S12 (YES in step S12), the control unit 40 determines whether or not the first period, for which the absolute value of the average current value of the AC driving current I at the time of the first polarity is equal to or larger than the first threshold value and the absolute value of the average current value of the AC driving current I at the time of the second polarity is equal to or larger than the second threshold value in step S12, continues for the first reference time or more (step S14). The first reference time may be set to about 0.5 second, for example. Step S14 corresponds to determining whether or not the arc discharge occurs stably from both of the electrodes 92 and 93.

When it is determined that the first period does not continue for the first reference time or more in step S14 (NO in step S14), steps S10 to S14 are repeated again.

When it is determined that the first period continues for the first reference time or more in step S14 (YES in step S14), the control unit 40 determines whether the length of the first time from the start of lighting driving operation of the discharge lamp 90 to the start of the first period is equal to or larger than first specified time (step S16). The first specified time may be experimentally determined according to the characteristic of a discharge lamp to be used. For example, the first specified time may be set to about 1 to 1.2 seconds.

When it is determined that the length of the first time is less than the first specified time in step S16 (NO in step S16), the control unit 40 performs driving control suitable for the discharge lamp in the early stage (step S18). When it is determined that the length of the first time is equal to or larger than the first specified time in step S16 (YES in step S16), the control unit 40 performs driving control suitable for the discharge lamp after the use for a long period of time (step S20).

Figure 9A:
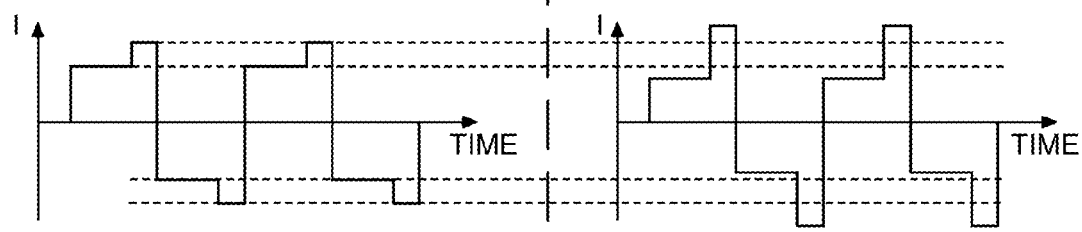
FIGS. 9A to 9C are graphs showing examples of the combination of a waveform example suitable for a discharge lamp in the early stage and a waveform example suitable for a discharge lamp after use for a long period of time.
Figure 9B:
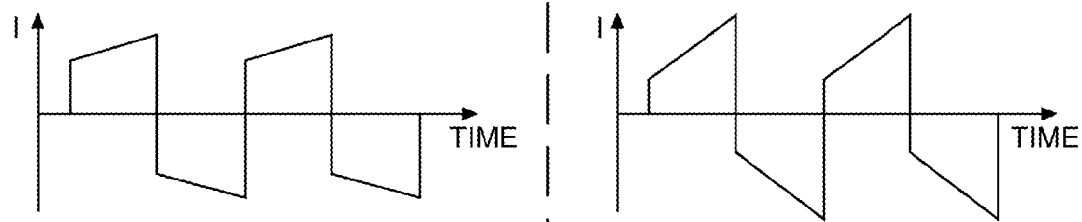
Figure 9C:
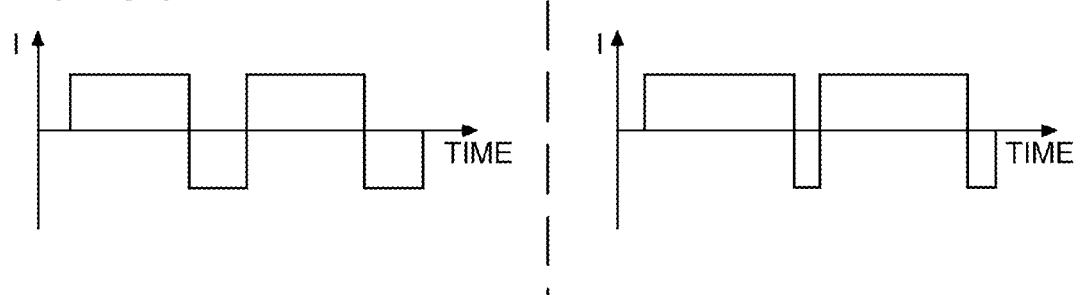

FIGS. 9A to 9C are graphs showing examples of the combination of a waveform example suitable for a discharge lamp in the early stage and a waveform example suitable for a discharge lamp after the use for a long period of time. The horizontal axis indicates time, and the vertical axis indicates the current value of the AC driving current I.

The waveform shown in FIG. 9A is a waveform which has a period, for which the current value is larger than that in the remaining period, in the last half of the half period of the AC driving current I. When driving the discharge lamp after the use for a long period of time, a control is performed such that a difference between the current value in the period, for which the current value is large, and the current value in the remaining period is larger than that when driving the discharge lamp in the early stage.

The waveform shown in FIG. 9B is a waveform in which the current value monotonically increases linearly in the half period of the AC driving current I. When driving the discharge lamp after the use for a long period of time, a control is performed such that a difference between the first and last current values in the half period is larger than that when driving the discharge lamp in the early stage.

The waveform shown in FIG. 9C is a waveform in which a period of the first polarity is longer than a period of the second polarity (duty ratio is large). When driving the discharge lamp after the use for a long period of time, a control is performed such that the duty ratio is larger than that when driving the discharge lamp in the early stage.

The electrode temperature can be largely changed by increasing the current value immediately before inversion of the polarity like the waveforms shown in FIGS. 9A and 9B or increasing the period of one polarity like the waveform shown in FIG. 9C. Accordingly, by increasing the temperature of the discharge lamp electrode so that the electrode tip can melt, the electrode shape can be made smooth. As a result, the discharge position becomes stabilized again, and it is possible to suppress a change in the discharge lamp driving voltage or a brightness change caused by flickering which is a problem especially when using the discharge lamp for a long period of time.

Thus, it becomes possible to set the suitable driving condition according to the state of the electrode of the discharge lamp 90 by setting the driving condition of the discharge lamp 90 on the basis of the length of the first time.

First Modification

Instead of the control based on the length of the first time, the control unit 40 performs second determination processing for determining whether or not a second period, for which either the absolute value of the average current value of the AC driving current I at the time of the first polarity or the absolute value of the average current value of the AC driving current I at the time of the second polarity is equal to or larger than a third threshold value, continues for the second reference time or more. When it is determined that the second period continues for the second reference time or more in the second determination processing, the control unit 40 may control the discharge lamp driving unit after predetermined time from the start of lighting driving operation of the discharge lamp on the basis of the length of second time from the start of lighting driving operation of the discharge lamp to the start of the second period.

In the present embodiment, an example is described in which the fixed time of about 2 to 3 seconds from the start of lighting driving operation is set as the "predetermined time". However, the "predetermined time" is preferably the time which is sufficient for performing the second determination processing. For example, predetermined time (for example, about 1 second) after elapse of the second reference time may also be set as the "predetermined time".

In the present embodiment, the control unit 40 controls the discharge lamp driving unit after the predetermined time from the start of lighting driving operation of the discharge lamp 90 on the basis of the length of time (second time) until the transition from the glow discharge period to the half-wave period of the arc discharge period is made from the start of lighting driving operation of the discharge lamp 90. The longer the discharge lamp 90 is used, the more difficult the temperature of the electrode is to rise. Accordingly, in this case, the second time becomes long. Thus, the driving condition of the discharge lamp 90 can be set appropriately on the basis of the second time.

Figure 10:
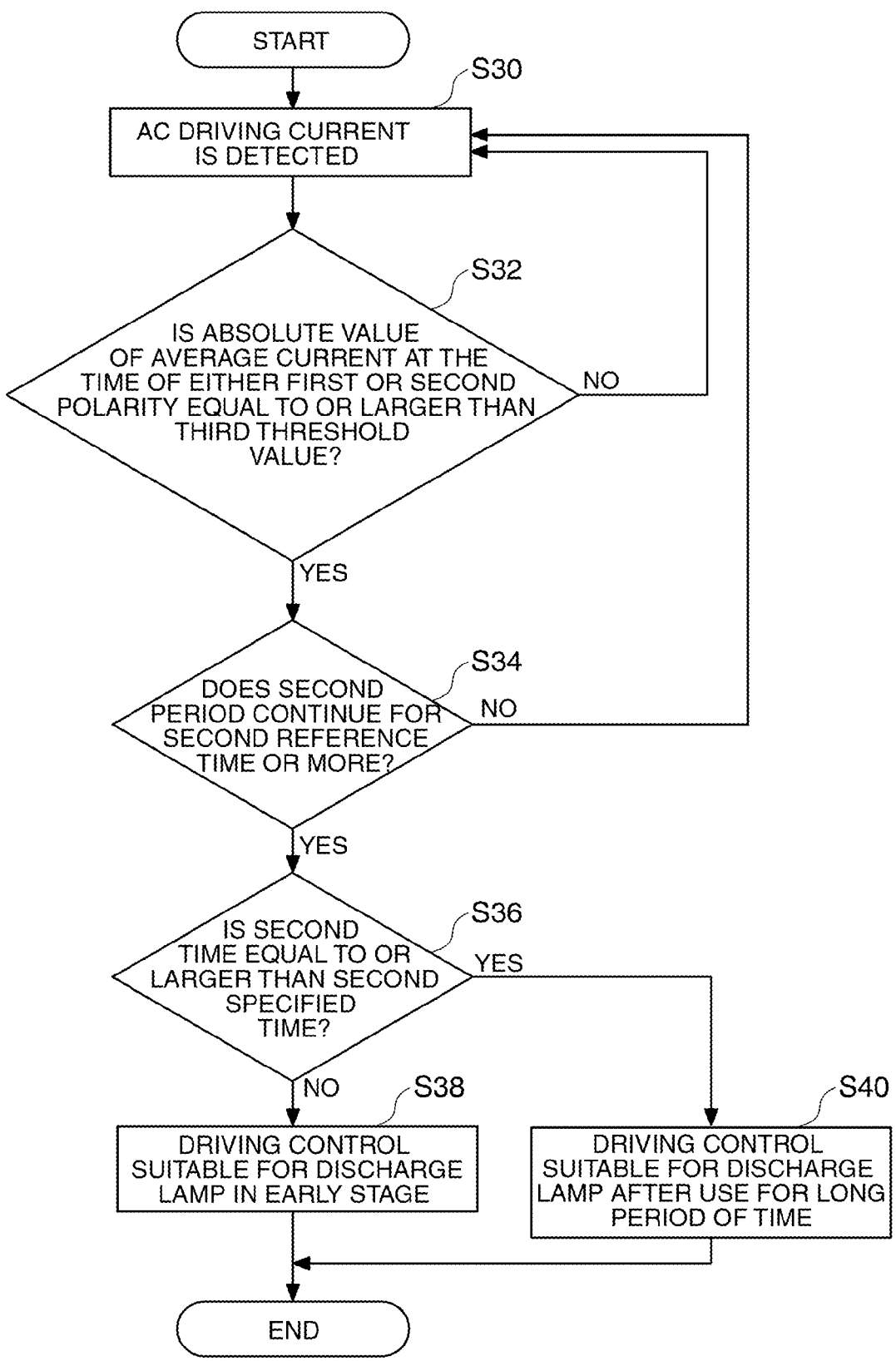
FIG. 10 is a flow chart showing an example regarding the control of a discharge lamp lighting device in a first modification.

FIG. 10 is a flowchart showing an example regarding the control of the discharge lamp lighting device in the first modification. In addition, processing including steps S32 and S34, which will be described later, corresponds to the second determination processing described above.

First, the current detecting section 63 detects the AC driving current I (step S30). Then, the control unit 40 determines whether or not either the absolute value of the average current value of the AC driving current I at the time of the first polarity or the absolute value of the average current value of the AC driving current I at the time of the second polarity is equal to or larger than the third threshold value (step S32). When it is determined that either the absolute value of the average current value of the AC driving current I at the time of the first polarity or the absolute value of the average current value of the AC driving current I at the time of the second polarity is not equal to or larger than the third threshold value in step S32 (NO in step S32), steps S30 to S32 are repeated.

The third threshold value may be set to about ½ of the set effective current value of the AC driving current I in the arc discharge section, for example. In the example shown in FIG. 7, the set effective current value of the AC driving current I is set to 2 Ampere. In this case, the third threshold value may be set to 1 Ampere.

When it is determined that either the absolute value of the average current value of the AC driving current I at the time of the first polarity or the absolute value of the average current value of the AC driving current I at the time of the second polarity is equal to or larger than the third threshold value in step S32 (YES in step S32), the control unit 40 determines whether or not the second period, for which either the absolute value of the average current value of the AC driving current I at the time of the first polarity or the absolute value of the average current value of the AC driving current I at the time of the second polarity is equal to or larger than the third threshold value in step S32, continues for the second reference time or more (step S34). The second reference time may be set to about 0.5 second, for example. Step S34 corresponds to determining whether or not the transition from the glow discharge period to the half-wave period of the arc discharge period has been made.

When it is determined that the second period does not continue for the second reference time or more in step S34 (NO in step S34), steps S30 to S34 are repeated again.

When it is determined that the second period continues for the second reference time or more in step S34 (YES in step S34), the control unit 40 determines whether the length of the second time from the start of lighting driving operation of the discharge lamp 90 to the start of the second period is equal to or larger than second specified time (step S36). The second specified time may be experimentally determined according to the characteristic of a discharge lamp to be used. For example, the second specified time may be set to about 0.1 second.

When it is determined that the length of the second time is less than the second specified time in step S36 (NO in step S36), the control unit 40 performs driving control suitable for the discharge lamp in the early stage (step S38). When it is determined that the length of the second time is equal to or larger than the second specified time in step S36 (YES in step S36), the control unit 40 performs driving control suitable for the discharge lamp after the use for a long period of time (step S40).

Examples of the combination of a waveform example suitable for a discharge lamp in the early stage and a waveform example suitable for a discharge lamp after the use for a long period of time are as shown in FIGS. 9A to 9C.

Thus, it becomes possible to set the suitable driving condition according to the state of the electrode of the discharge lamp 90 by setting the driving condition of the discharge lamp 90 on the basis of the length of the second time.

Second Modification

Instead of the control based on the length of the first or second time, the control unit 40 performs first determination processing for determining whether or not the first period, for which the absolute value of the average current value of the AC driving current I at the time of the first polarity is equal to or larger than the first threshold value and the absolute value of the average current value of the AC driving current I at the time of the second polarity is equal to or larger than the second threshold value, continues for the first reference time or more and second determination processing for determining whether or not the second period, for which either the absolute value of the average current value of the AC driving current I at the time of the first polarity or the absolute value of the average current value of the AC driving current I at the time of the second polarity is equal to or larger than the third threshold value, continues for the second reference time or more. When it is determined that the first period continues for the first reference time or more in the first determination processing and the second period continues for the second reference time or more in the second determination processing, the control unit 40 may control the discharge lamp driving unit after predetermined time from the start of lighting driving operation of the discharge lamp 90 on the basis of the length of third time from the start of the second period to the start of the first period.

In the present embodiment, an example is described in which the fixed time of about 2 to 3 seconds from the start of lighting driving operation is set as the "predetermined time". However, the "predetermined time" is preferably the time which is sufficient for performing the first determination processing. For example, predetermined time (for example, about 1 second) after elapse of the first reference time may also be set as the "predetermined time".

In the present embodiment, the control unit 40 controls the discharge lamp driving unit after the predetermined time from the start of lighting driving operation of the discharge lamp 90 on the basis of the length of time (third time) of the half-wave period of the arc discharge period. The longer the discharge lamp 90 is used, the more difficult the temperature of the electrode is to rise. Accordingly, in this case, the third time becomes long. Thus, the driving condition of the discharge lamp 90 can be set appropriately on the basis of the third time.

Figure 11:
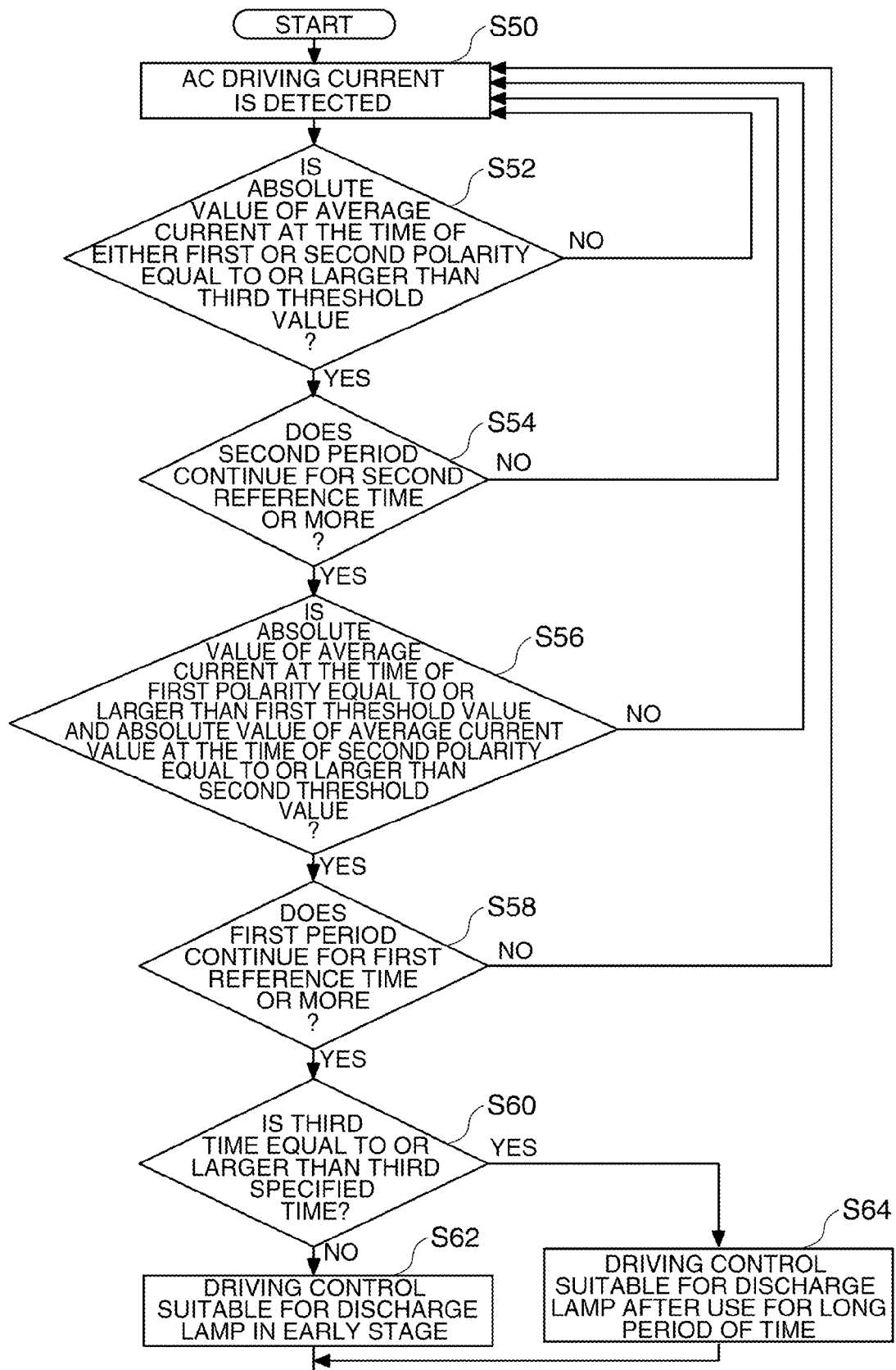
FIG. 11 is a flow chart showing an example regarding the control of a discharge lamp lighting device in a second modification.

FIG. 11 is a flow chart showing an example regarding the control of the discharge lamp lighting device in the second modification. In addition, processing including steps S56 and S58, which will be described later, corresponds to the first determination processing described above. In addition, processing including steps S52 and S54, which will be described later, corresponds to the second determination processing described above.

First, the current detecting section 63 detects the AC driving current I (step S50). Then, the control unit 40 determines whether or not either the absolute value of the average current value of the AC driving current I at the time of the first polarity or the absolute value of the average current value of the AC driving current I at the time of the second polarity is equal to or larger than the third threshold value (step S52). When it is determined that either the absolute value of the average current value of the AC driving current I at the time of the first polarity or the absolute value of the average current value of the AC driving current I at the time of the second polarity is not equal to or larger than the third threshold value in step S52 (NO in step S52), steps S50 to S52 are repeated.

The third threshold value may be set to about ½ of the set effective current value of the AC driving current I in the arc discharge section, for example. In the example shown in FIG. 7, the set effective current value of the AC driving current I is set to 2 Ampere. In this case, the third threshold value may be set to 1 Ampere.

When it is determined that either the absolute value of the average current value of the AC driving current I at the time of the first polarity or the absolute value of the average current value of the AC driving current I at the time of the second polarity is equal to or larger than the third threshold value in step S52 (YES in step S52), the control unit 40 determines whether or not the second period, for which either the absolute value of the average current value of the AC driving current I at the time of the first polarity or the absolute value of the average current value of the AC driving current I at the time of the second polarity is equal to or larger than the third threshold value in step S52, continues for the second reference time or more (step S54). The first reference time may be set to about 0.5 second, for example. Step S34 corresponds to determining whether or not the transition from the glow discharge period to the half-wave period of the arc discharge period has been made.

When it is determined that the second period does not continue for the second reference time or more in step S54 (NO in step S54), steps S50 to S54 are repeated again.

When it is determined that the second period continues for the second reference time or more in step S54 (YES in step S54), the control unit 40 determines whether or not the absolute value of the average current value of the AC driving current I at the time of the first polarity is equal to or larger than the first threshold value and the absolute value of the average current value of the AC driving current I at the time of the second polarity is equal to or larger than the second threshold value (step S56). When it is determined that the absolute value of the average current value of the AC driving current I at the time of the first polarity is not equal to or larger than the first threshold value and the absolute value of the average current value of the AC driving current I at the time of the second polarity is not equal to or larger than the second threshold value in step S56 (NO in step S56), steps S50 to S56 are repeated.

The first and second threshold values may be set to about ½ of the set effective current value of the AC driving current I in the arc discharge section, for example. In the example shown in FIG. 7, the set effective current value of the AC driving current I is set to 2 Ampere. In this case, the first and second threshold values may be set to 1 Ampere. In the present embodiment, the first and second threshold values are the same values. However, the first and second threshold values may be different values.

When it is determined that the absolute value of the average current value of the AC driving current I at the time of the first polarity is equal to or larger than the first threshold value and the absolute value of the average current value of the AC driving current I at the time of the second polarity is equal to or larger than the second threshold value in step S56 (YES in step S56), the control unit 40 determines whether or not the first period, for which the absolute value of the average current value of the AC driving current I at the time of the first polarity is equal to or larger than the first threshold value and the absolute value of the average current value of the AC driving current I at the time of the second polarity is equal to or larger than the second threshold value in step S56, continues for the first reference time or more (step S58). The first reference time may be set to about 0.5 second, for example. Step S58 corresponds to determining whether or not the arc discharge occurs stably from both of the electrodes 92 and 93.

When it is determined that the first period does not continue for the first reference time or more in step S58 (NO in step S58), steps S50 to S58 are repeated again.

When it is determined that the first period continues for the first reference time or more in step S58 (YES in step S58), the control unit 40 determines whether the length of the third time from the start of the second period to the start of the first period is equal to or larger than third specified time (step S60). The third specified time may be experimentally determined according to the characteristic of a discharge lamp to be used. For example, the third specified time may be set to about 1 to 1.2 seconds.

When it is determined that the length of the third time is less than the third specified time in step S60 (NO in step S60), the control unit 40 performs driving control suitable for the discharge lamp in the early stage (step S62). When it is determined that the length of the third time is equal to or larger than the third specified time in step S60 (YES in step S60), the control unit 40 performs driving control suitable for the discharge lamp after the use for a long period of time (step S64).

Examples of the combination of a waveform example suitable for a discharge lamp in the early stage and a waveform example suitable for a discharge lamp after the use for a long period of time are as shown in FIGS. 9A to 9C.

Thus, it becomes possible to set the suitable driving condition according to the state of the electrode of the discharge lamp 90 by setting the driving condition of the discharge lamp 90 on the basis of the length of the third time.

Third Modification

In addition to the process of controlling the discharge lamp driving unit after the predetermined time from the start of lighting driving operation of the discharge lamp 90 on the basis of the length of one of the first to third times, the control unit 40 may perform specification determination processing for determining the specification of the discharge lamp 90 on the basis of the length of one of the first to third times and control the discharge lamp driving unit after the predetermined time from the start of lighting driving operation of the discharge lamp 90 on the basis of a result of the specification determination processing.

The heat capacity of an electrode in a discharge lamp changes with the specification, such as rated power. Accordingly, the lengths of the first time, second time, and third time change with the difference in the specification of a discharge lamp. Accordingly, it becomes possible to determine the specification of a discharge lamp on the basis of the length of one of the first to third times and to set the more suitable driving condition according to the specification of the discharge lamp based on the determination result.

In addition, the control unit 40 may perform the specification determination processing at the time of first lighting after connection between the discharge lamp lighting device 10 and the discharge lamp 90 or after resetting of the discharge lamp lighting device 10. This is because, in many cases, it is sufficient to perform the specification determination processing of a discharge lamp at the time of first lighting after connection with the discharge lamp or at the time of first lighting after resetting the driving condition by exchanging the discharge lamp, for example.

Figure 12:
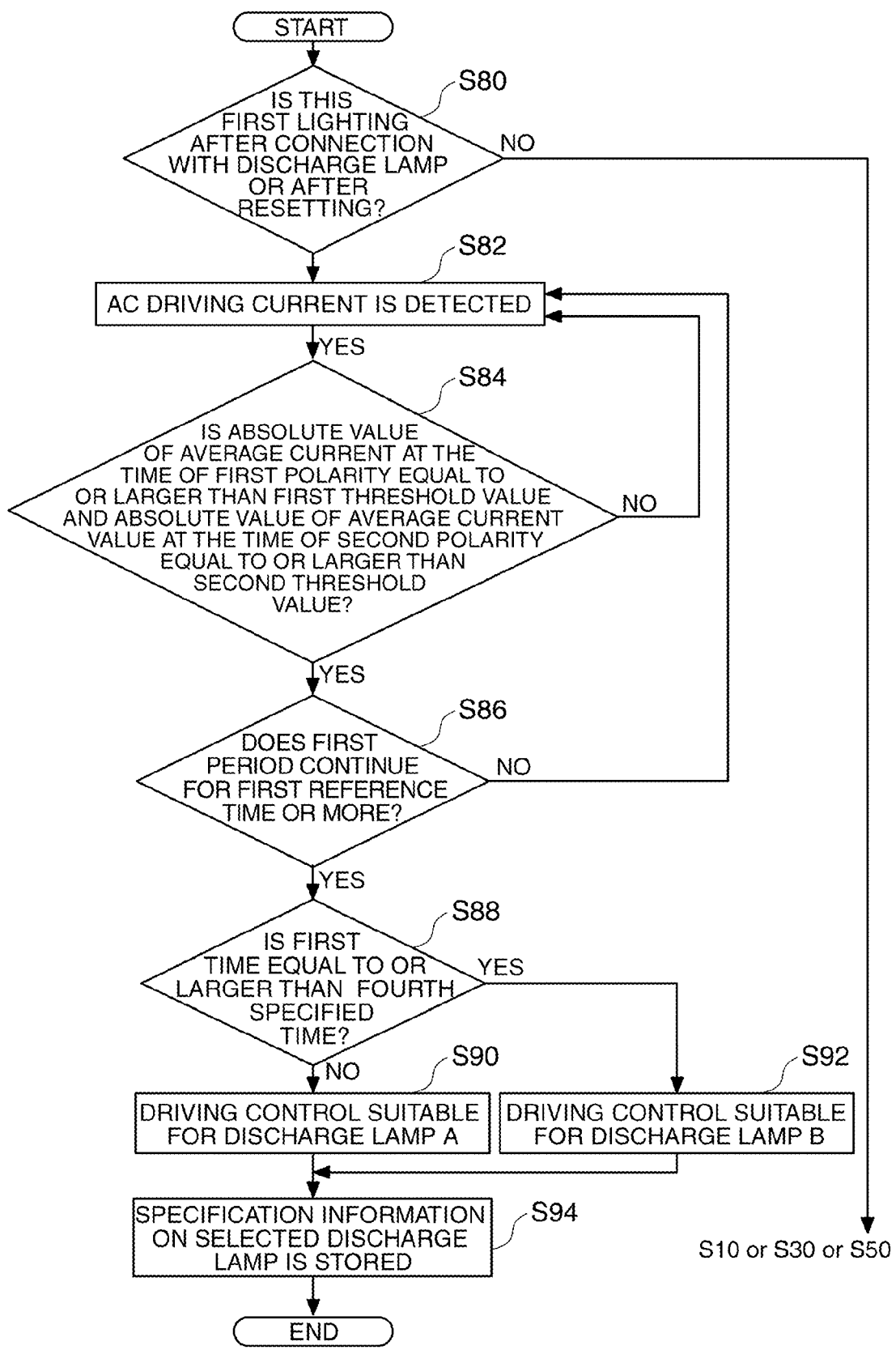
FIG. 12 is a flow chart showing an example regarding the control of a discharge lamp lighting device in a third modification.

FIG. 12 is a flow chart showing an example regarding the control of the discharge lamp lighting device in the third modification. The example shown in FIG. 12 illustrates an example in which the specification determination processing is performed on the basis of the first time. In addition, FIG. 12 shows the case in which there are two kinds of discharge lamps (discharge lamps supported) that can be used in the discharge lamp lighting device 10, that is, a discharge lamp A and a discharge lamp B.

First, the control unit 40 determines whether or not this is first lighting after connection between the discharge lamp lighting device 10 and the discharge lamp 90 or after resetting of the discharge lamp lighting device 10 (step S80). This determination is performed on the basis of whether or not the information regarding the specification of the discharge lamp is stored in the storage unit 44, for example.

When it is determined that the lighting is not first lighting in step S80 (NO in step S80), the process proceeds to step S10, S30, or S50 of the flow charts shown in FIGS. 8, 10, and 11. Then, the process proceeds according to each flow chart. This is because the information regarding the specification of the discharge lamp is already stored in the storage unit 44 or the like when the lighting is not first lighting and accordingly, it is not necessary to perform the specification determination processing again.

When it is determined that this is first lighting in step S80 (YES in step S80), the current detecting section 63 detects the AC driving current I (step S82). Then, the control unit 40 determines whether or not the absolute value of the average current value of the AC driving current I at the time of the first polarity is equal to or larger than the first threshold value and the absolute value of the average current value of the AC driving current I at the time of the second polarity is equal to or larger than the second threshold value (step S84). When it is determined that the absolute value of the average current value of the AC driving current I at the time of the first polarity is not equal to or larger than the first threshold value and the absolute value of the average current value of the AC driving current I at the time of the second polarity is not equal to or larger than the second threshold value in step S84 (NO in step S84), steps S82 to S84 are repeated.

When it is determined that the absolute value of the average current value of the AC driving current I at the time of the first polarity is equal to or larger than the first threshold value and the absolute value of the average current value of the AC driving current I at the time of the second polarity is equal to or larger than the second threshold value in step S84 (YES in step S84), the control unit 40 determines whether or not the first period, for which the absolute value of the average current value of the AC driving current I at the time of the first polarity is equal to or larger than the first threshold value and the absolute value of the average current value of the AC driving current I at the time of the second polarity is equal to or larger than the second threshold value in step S84, continues for the first reference time or more (step S86). The first reference time may be set to about 0.5 second, for example.

When it is determined that the first period does not continue for the first reference time or more (NO in step S86) in step S86, steps S82 to S86 are repeated again.

When it is determined that the first period continues for the first reference time or more in step S86 (YES in step S86), the control unit 40 determines whether the length of the first time from the start of lighting driving operation of the discharge lamp 90 to the start of the first period is equal to or larger than fourth specified time (step S88). The fourth specified time may be experimentally determined according to the characteristic of discharge lamps (discharge lamp A and discharge lamp B) to be used. For example, the fourth specified time may be set to about 1 to 1.2 seconds.

When it is determined that the length of the first time is less than the fourth specified time in step S88 (NO in step S88), the control unit 40 performs driving control suitable for the discharge lamp A (step S90). When it is determined that the length of the first time is equal to or larger than the fourth specified time in step S88 (YES in step S88), the control unit 40 performs driving control suitable for the discharge lamp B (step S92).

The driving control suitable for the discharge lamp A in step S90 may be driving control suitable for the early stage of the discharge lamp A. Similarly, the driving control suitable for the discharge lamp B in step S92 may be driving control suitable for the early stage of the discharge lamp B.

This is because the case where the driving control in step S90 or S92 is performed is the case where the discharge lamp A or the discharge lamp B is connected to the discharge lamp lighting device 10 or is exchanged to light first.

After step S90 or S92, the control unit 40 stores the information regarding the specification of the selected discharge lamp in the storage unit 44 (step S94).

In the above example, the processing for determining the specification of the discharge lamp 90 was performed on the basis of the length of the first time. However, the processing for determining the specification of the discharge lamp 90 maybe performed on the basis of the length of the second or third time instead of the length of the first time.

By determining the specification of a discharge lamp on the basis of the length of one of the first to third times and setting the driving condition on the basis of the determination result, it becomes possible to set the optimal driving condition corresponding to the specification (kind) of the discharge lamp.

3. Circuit Configuration of a Projector

Figure 13:
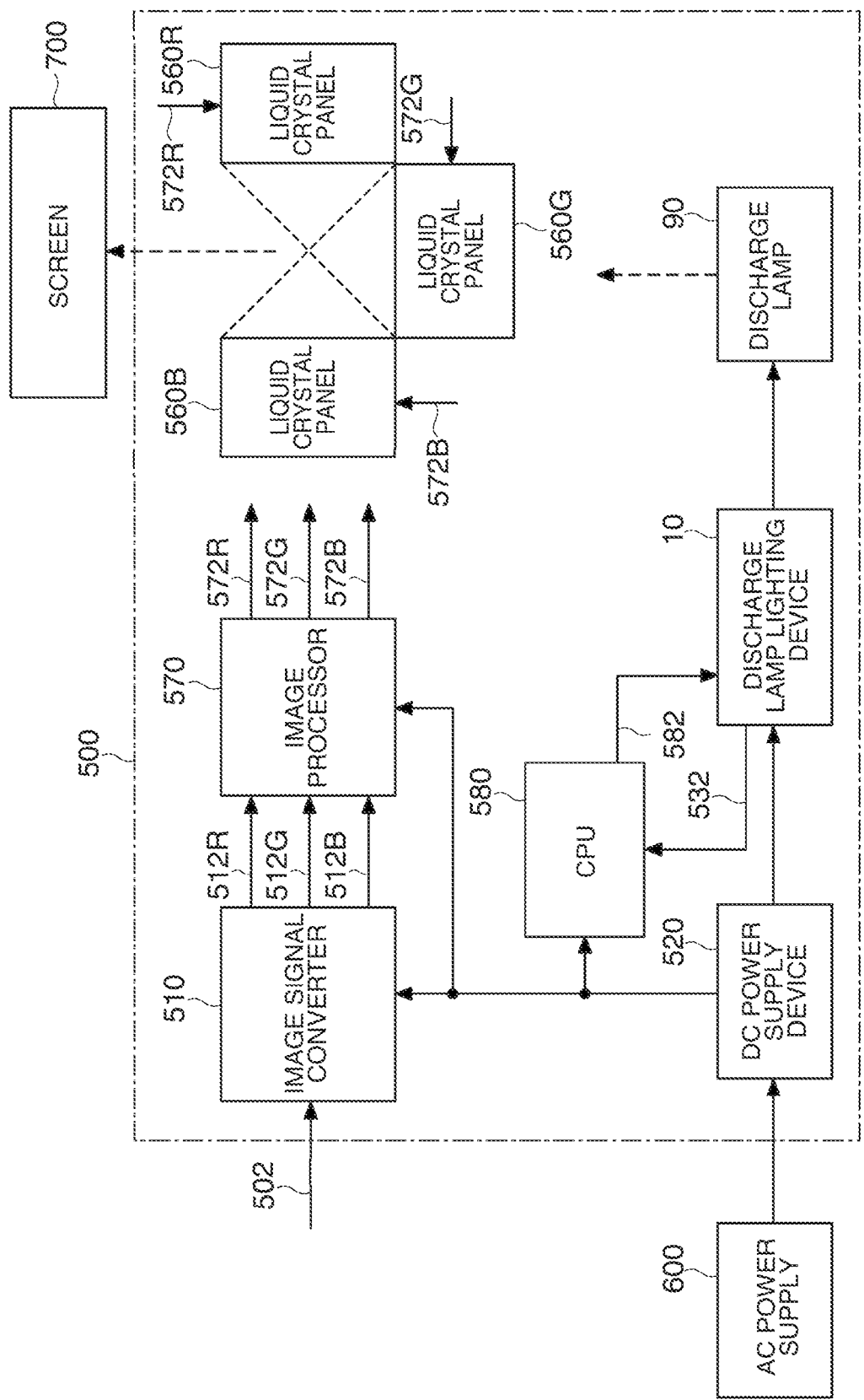
FIG. 13 is a view showing an example of the circuit configuration of the projector according to the present embodiment.

FIG. 13 is a view showing an example of the circuit configuration of the projector according to the present embodiment. The projector 500 includes not only the above-described optical system but also an image signal converter 510, a DC power supply device 520, the discharge lamp lighting device 10, the discharge lamp 90, the liquid crystal panels 560R, 560G, and 560B, and an image processor 570.

The image signal converter 510 converts an image signal 502 (for example, brightness signal and color difference signal or analog RGB signal), which is input from the outside, into a digital RGB signal with a predetermined word length to thereby generate image signals 512R, 512G, and 512B and then supplies the image signals 512R, 512G, and 512B to the image processor 570.

The image processor 570 performs image processing on the three image signals 512R, 512G, and 512B and outputs driving signals 572R, 572G, and 572B for driving the liquid crystal panels 560R, 560G, and 560B, respectively.

The DC power supply device 520 converts the AC voltage supplied from an external AC power supply 600 into the fixed DC voltage and then supplies the DC voltage to the image signal converter 510 located at the secondary side of a transformer (included in the DC power supply device 520 although not shown), the image processor 570, and the discharge lamp lighting device 10 located at the primary side of the transformer.

At the start of the discharge lamp lighting device 10, the discharge lamp lighting device 10 generates a high voltage between electrodes of the discharge lamp 90 so that a discharge path is formed by dielectric breakdown. Then, the discharge lamp lighting device 10 supplies a driving current for making the discharge lamp 90 keep the discharge.

The liquid crystal panels 560R, 560G, and 560B modulate the brightness of color light, which is incident on each liquid crystal panel, by the driving signals 572R, 572G, and 572B, respectively.

A CPU (Central Processing Unit) 580 controls an operation until the projector is turned off after the start of lighting in the projector. When power is supplied to the projector and the output voltage of the DC power supply device 520 reaches a predetermined value, the CPU 580 generates a lighting signal 582 and supplies the lighting signal 582 to the discharge lamp lighting device 10. In addition, the CPU 580 may receive lighting information 532 on the discharge lamp 90 from the discharge lamp lighting device 10.

The projector 500 configured as described above can set the driving condition of a discharge lamp more appropriately. Accordingly, it is possible to realize a projector capable of maintaining the projection brightness for a long period of time.

In each of the above embodiments, the projector which uses three liquid crystal panels was illustrated. However, the invention is not limited thereto and may also be applied to a projector which uses one, two, or four or more liquid crystal panels.

In each of the above embodiments, the transmissive projector was illustrated. However, the invention is not limited thereto and may also be applied to a reflective projector. Here, "transmissive" means that an electro-optical modulator as a light modulation means is of a type in which light is transmitted therethrough like a transmissive liquid crystal panel, and "reflective" means that an electro-optical modulator as a light modulation means is of a type in which light is reflected therefrom like a reflective liquid crystal panel or a micromirror type modulator. As the micromirror type modulator, a DMD (digital micromirror device; trademark of Texas Instruments) may be used, for example. Also when the invention is applied to the reflective projector, the same effects as in the transmissive projector can be acquired.

The invention may be applied to both a front projection type projector, which projects a projected image from the observation side, and a rear projection type projector, which projects a projected image from the opposite side to the observation side.

In addition, the invention is not limited to the above-described embodiments, and various modifications maybe made within the scope and spirit of the invention.

The invention includes substantially the same configuration (for example, a configuration with the same function, method, and result or a configuration with the same object and effect) as the configuration described in the embodiment. In addition, the invention includes a configuration which replaces a portion that is not essential in the configuration described in the embodiment. In addition, the invention includes a configuration capable of achieving the same operation and effect as in the configuration described in the embodiment or a configuration capable of achieving the same object. In addition, the invention includes a configuration in which a known technique is added to the configuration described in the embodiment.

In the above embodiment, the example was described in which two kinds of control were performed assuming a discharge lamp in the early stage and a discharge lamp after use for a long period of time. However, it may be possible to set a plurality of reference times according to the time of use of a discharge lamp and to perform three or more kinds of control.

Moreover, in the above embodiment, the example was described in which two kinds of control were performed assuming the case where there were two kinds of discharge lamps that could be used in the discharge lamp lighting device. However, when there are three or more kinds of discharge lamps that can be used in the discharge lamp lighting device, it may be possible to set a plurality of reference times according to the kinds of the discharge lamps and to perform three or more kinds of control.

Moreover, for example, regarding the driving condition that the control unit 40 uses, a table in which the determination condition (for example, the length of the first specified time, second specified time, or third specified time) and the driving condition correspond with each other may be stored beforehand in the storage unit 44 or the like, and the control unit 40 may set the driving condition by selecting the optimal driving condition from the table.

The entire disclosure of Japanese Patent Application No. 2008-332968, filed Dec. 26, 2008 is expressly incorporated by reference herein.

What is claimed is:
1. A discharge lamp lighting device comprising:
a discharge lamp driving unit that supplies an AC driving current to a discharge lamp to drive the discharge lamp;
a current detecting unit that detects the AC driving current supplied to the discharge lamp; and
a control unit that controls the discharge lamp driving unit, the control unit controlling the discharge lamp driving unit after a predetermined time from the start of lighting driving operation of the discharge lamp on the basis of the behavior of the AC driving current detected by the current detecting unit at the predetermined time from the start of lighting driving operation of the discharge lamp, and
wherein the control unit performs a first determination processing for determining whether or not a first period, for which an absolute value of an average current value of the AC driving current at a time of first polarity is equal to or larger than a first threshold value and an absolute value of an average current value of the AC driving current at a time of second polarity is equal to or larger than a second threshold value, continues for a first reference time or more and controls the discharge lamp driving unit after the predetermined time from the start of lighting driving operation of the discharge lamp on a basis of a length of a first time from the start of lighting driving operation of the discharge lamp to a start of the first period when it is determined that the first period continues for the first reference time or more in the first determination processing.

2. The discharge lamp lighting device according to claim 1, wherein the control unit performs specification determination processing for determining the specification of the discharge lamp on the basis of the length of one of the first to third times and controls the discharge lamp driving unit after the predetermined time from the start of lighting driving operation of the discharge lamp on the basis of a result of the specification determination processing.

3. The discharge lamp lighting device according to claim 2, wherein the control unit performs the specification determination processing at the time of first lighting after connection between the discharge lamp lighting device and the discharge lamp or after resetting of the discharge lamp lighting device.

4. A projector comprising the discharge lamp lighting device according to claim 3.

5. A projector comprising the discharge lamp lighting device according to claim 2.

6. The discharge lamp lighting device according to claim 1, wherein the discharge lamp driving unit includes:
a power control circuit that generates power for driving a discharge lamp; and
an AC conversion circuit that generates and outputs the AC driving current, which is supplied to the discharge lamp, by inverting the polarity of a direct current output from the power control circuit at predetermined timing, and
the control unit controls the discharge lamp driving unit after the predetermined time from the start of lighting driving operation of the discharge lamp by performing at least one of AC conversion control for controlling polarity inversion timing of the AC driving current with respect to the AC conversion circuit and current control for controlling a current value of a direct current, which is output from the power control circuit, with respect to the power control circuit.

7. A projector comprising the discharge lamp lighting device according to claim 6.

8. The discharge lamp lighting device according to claim 1, wherein the control unit controls at least one of a current value, frequency, duty ratio, and waveform of the AC driving current by controlling the discharge lamp driving unit.

9. A projector comprising the discharge lamp lighting device according to claim 8.

10. A projector comprising the discharge lamp lighting device according to claim 1.

11. A discharge lamp lighting device comprising:
a discharge lamp driving unit that supplies an AC driving current to a discharge lamp to drive the discharge lamp;
a current detecting unit that detects the AC driving current supplied to the discharge lamp; and
a control unit that controls the discharge lamp driving unit, the control unit controlling the discharge lamp driving unit after a predetermined time from a start of lighting driving operation of the discharge lamp on a basis of a behavior of the AC driving current detected by the current detecting unit at the predetermined time from the start of lighting driving operation of the discharge lamp, and
wherein the control unit performs a second determination processing for determining whether or not a second period, for which either an absolute value of an average current value of the AC driving current at a time of first polarity or an absolute value of an average current value of the AC driving current at a time of second polarity is equal to or larger than a third threshold value, continues for a second reference time or more and controls the discharge lamp driving unit after the predetermined time from the start of lighting driving operation of the discharge lamp on a basis of a length of a second time from the start of lighting driving operation of the discharge lamp to a start of the second period when it is determined that the second period continues for the second reference time or more in the second determination processing.

12. A projector comprising the discharge lamp lighting device according to claim 11.

13. A discharge lamp lighting device comprising:
a discharge lamp driving unit that supplies an AC driving current to a discharge lamp to drive the discharge lamp;
a current detecting unit that detects the AC driving current supplied to the discharge lamp; and
a control unit that controls the discharge lamp driving unit, the control unit controlling the discharge lamp driving unit after a predetermined time from a start of lighting driving operation of the discharge lamp on a basis of a behavior of the AC driving current detected by the current detecting unit at the predetermined time from the start of lighting driving operation of the discharge lamp, and
wherein the control unit performs a first determination processing for determining whether or not a first period, for which an absolute value of an average current value of the AC driving current at a time of first polarity is equal to or larger than a first threshold value and an absolute value of an average current value of the AC driving current at a time of second polarity is equal to or larger than a second threshold value, continues for a first reference time or more and a second determination processing for determining whether or not a second period, for which either the absolute value of the average current value of the AC driving current at the time of the first polarity or the absolute value of the average current value of the AC driving current at the time of the second polarity is equal to or larger than a third threshold value, continues for a second reference time or more and controls the discharge lamp driving unit after the predetermined time from the start of lighting driving operation of the discharge lamp on a basis of a length of a third time from a start of the second period to a start of the first period when it is determined that the first period continues for the first reference time or more in the first determination processing and the second period continues for the second reference time or more in the second determination processing.

14. A projector comprising the discharge lamp lighting device according to claim 13.

15. A control method of a discharge lamp lighting device including a discharge lamp driving unit that supplies an AC driving current to a discharge lamp to drive the discharge lamp, a current detecting unit that detects the AC driving current supplied to the discharge lamp, and a control unit that controls the discharge lamp driving unit, comprising:
controlling the discharge lamp driving unit after a predetermined time from a start of lighting driving operation of the discharge lamp on a basis of a behavior of the AC driving current, which is detected by the current detecting unit at the predetermined time from the start of lighting driving operation of the discharge lamp, including:

performing a first determination processing for determining whether or not a first period, for which an absolute value of an average current value of the AC driving current at a time of first polarity is equal to or larger than a first threshold value and an absolute value of an average current value of the AC driving current at a time of second polarity is equal to or larger than a second threshold value, continues for a first reference time or more, and controlling the discharge lamp driving unit after the predetermined time from the start of lighting driving operation of the discharge lamp on a basis of a length of a first time from the start of lighting driving operation of the discharge lamp to a start of the first period when it is determined that the first period continues for the first reference time or more in the first determination processing.

* * * * *